(12) United States Patent
Shiohara

(10) Patent No.: US 10,477,139 B2
(45) Date of Patent: Nov. 12, 2019

(54) IMAGING DISPLAY APPARATUS

(71) Applicant: SEIKO EPSON CORPORATION, Tokyo (JP)

(72) Inventor: Ryuichi Shiohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/500,169

(22) PCT Filed: Aug. 6, 2015

(86) PCT No.: PCT/JP2015/003954
§ 371 (c)(1),
(2) Date: Jan. 30, 2017

(87) PCT Pub. No.: WO2016/024393
PCT Pub. Date: Feb. 18, 2016

(65) Prior Publication Data
US 2017/0264860 A1  Sep. 14, 2017

(30) Foreign Application Priority Data

Aug. 11, 2014 (JP) .................. 2014-163440
Jul. 6, 2015 (JP) .................. 2015-135478

(51) Int. Cl.
*H04N 7/01* (2006.01)
*G09G 5/00* (2006.01)
(Continued)

(52) U.S. Cl.
CPC ......... *H04N 7/0127* (2013.01); *G09G 3/3611* (2013.01); *G09G 5/00* (2013.01); *G09G 5/001* (2013.01); *G09G 5/005* (2013.01); *G09G 5/12* (2013.01); *H04N 5/06* (2013.01); *H04N 5/23293* (2013.01); *G09G 2310/06* (2013.01); *G09G 2370/12* (2013.01)

(58) Field of Classification Search
CPC ..... H04N 7/0127; H04N 5/06; H04N 5/23293
See application file for complete search history.

(56) References Cited

U.S. PATENT DOCUMENTS

2002/0021364 A1* 2/2002 Asada ................ H04N 5/232
348/312
2003/0210338 A1* 11/2003 Matsuoka .......... H04N 5/23293
348/231.99
(Continued)

FOREIGN PATENT DOCUMENTS

JP  2004-266373 A  9/2004
JP  2007-158434 A  6/2007
(Continued)

*Primary Examiner* — Jason A Flohre

(57) ABSTRACT

An imaging display apparatus includes an imaging unit that images a subject at a first frame rate and outputs an imaging signal, an image processing portion that generates an image signal based on the imaging signal, a VRAM that stores the image signal, and a display unit that performs displaying based on the image signal at a second frame rate which is equal to or greater than N (N is a natural number equal to or greater than 2) times the first frame rate. The VRAM stores the image signals for one frame to be displayed by the display unit. The display unit performs displaying N times based on the image signals for one frame.

5 Claims, 21 Drawing Sheets

(51) Int. Cl.
  *G09G 5/12*  (2006.01)
  *H04N 5/06*  (2006.01)
  *H04N 5/232*  (2006.01)
  *G09G 3/36*  (2006.01)

(56) References Cited

U.S. PATENT DOCUMENTS

| | | | |
|---|---|---|---|
| 2006/0147187 A1* | 7/2006 | Takemoto | H04N 5/372 |
| | | | 386/226 |
| 2006/0232688 A1* | 10/2006 | Suzuki | H04N 5/77 |
| | | | 348/231.99 |
| 2007/0211153 A1 | 9/2007 | Uchida et al. | |
| 2008/0165268 A1* | 7/2008 | Takahashi | H04N 5/232 |
| | | | 348/333.01 |
| 2009/0122188 A1* | 5/2009 | Hanaoka | H04N 5/145 |
| | | | 348/459 |
| 2009/0180000 A1* | 7/2009 | Shiraishi | H04N 5/2628 |
| | | | 348/223.1 |
| 2010/0086282 A1* | 4/2010 | Takahashi | H04N 7/0112 |
| | | | 386/241 |
| 2011/0285694 A1 | 11/2011 | Shiohara | |
| 2011/0285734 A1 | 11/2011 | Shiohara | |
| 2011/0285894 A1 | 11/2011 | Shiohara et al. | |
| 2014/0028909 A1* | 1/2014 | Tanigawa | H04N 7/0127 |
| | | | 348/441 |
| 2015/0042860 A1 | 2/2015 | Shiohara et al. | |

FOREIGN PATENT DOCUMENTS

| | | |
|---|---|---|
| JP | 2007-243615 A | 9/2007 |
| JP | 2011-244170 A | 12/2011 |
| JP | 2013-201613 A | 10/2013 |

\* cited by examiner

IMAGING DISPLAY APPARATUS

TECHNICAL FIELD

The present invention relates to an imaging display apparatus.

BACKGROUND ART

In so-called mirrorless digital cameras, an image of a subject can be checked through a so-called live view operation in which the image corresponding to an imaging signal imaged by an image sensor such as a charge coupled device (CCD) and a complementary metal-oxide semiconductor (CMOS) image sensor is displayed in real time in an electronic view finder (hereinafter, will be referred to as an electronic view finder [EVF]) attached to a liquid crystal panel or an upper portion of a housing provided on a rear surface of the housing. PTL 1 discloses an imaging display apparatus in which an image signal obtained by performing image processing with respect to an imaging signal output from an image sensor is stored in a VRAM and the image signal read out from the VRAM is supplied to a display unit. In the imaging display apparatus, a reference signal for the timing reading out an image signal from the VRAM is delayed and a reference vertical synchronizing signal for a start of a frame of an imaging signal output from the image sensor is generated. Therefore, a frame rate of the image sensor and a frame rate of the display unit match each other.

CITATION LIST

Patent Literature

PTL 1: Japanese Unexamined Patent Application Publication No. 2007-243615

SUMMARY OF INVENTION

Technical Problem

In image sensors, there is an image sensor which can operate in only a live view mode of 24 fps for motion picture, and there is an image sensor which can operate in only the live view mode of 30 fps for general video (for TV display). Meanwhile, in an EVF, in order to reduce an influence of a leakage current, or in order to realize reduction in size, there is an image sensor which is designed on the premise of an operation performed at equal to or greater than 60 fps.

When a display unit is driven at a low frame rate (for example, 30 fps), a period for holding a writing voltage in each of the pixels is elongated. Therefore, there are problems in that the writing voltage to be held is deteriorated due to the leakage current and a flicker or deterioration of image quality is caused. On the other hand, in order to stably perform the operation at the low frame rate, countermeasures such as increasing the capacity of a signal holding capacitor disposed in each of the pixels are required. However, the capacitor having a large capacity is not suitable for fine design, thereby leading to a large-sized substrate.

The present invention has been made in consideration of the above-described circumstances, and one of the problems to be solved is to minimize a delay of displaying when an image sensor which operates at a low frame rate such as 24 fps and 30 fps, and an EVF which operates at a high frame rate such as 60 fps are used in combination with each other.

Solution to Problem

In order to solve the aforementioned problem, according to an aspect of the present invention, there is provided an imaging display apparatus including an imaging unit that images a subject at a first frame rate and outputs an imaging signal, an image processing portion that generates an image signal based on the imaging signal, a storage unit that stores the image signal, and a display unit that performs displaying based on the image signal at a second frame rate which is equal to or greater than N (N is a natural number equal to or greater than 2) times the first frame rate. The storage unit stores image signals for one frame to be displayed by the display unit. The display unit performs displaying N times based on the image signals for one frame.

According to the aspect, in a case where the frame rate of the imaging unit is equal to or smaller than 1/N of the frame rate of the display unit, an image signal obtained by performing image processing with respect to an imaging signal is stored in the storage unit, and the image signal is read out N times from the storage unit and is supplied to the display unit. Therefore, in a case where the imaging unit which operates at a low frame rate such as 24 fps and 30 fps, and the display unit which operates at a high frame rate such as twice and three times the frame rate of the imaging unit are used in combination with each other, a delay of displaying can be shortened. Moreover, the operation of the display unit can be synchronized with the operation of the imaging unit.

In the aspect of the imaging display apparatus described above, it is preferable that the display unit perform displaying N times based on the image signals for one frame after the image signals for one frame are generated. According to the aspect, reading-out starts after the image signals for one frame are generated. Therefore, there is no chance for reading-out the image signal from the storage unit to overtake writing of the image signal. Thus, an image can be reliably displayed.

In the aspect of the imaging display apparatus described above, it is preferable that the display unit start to perform displaying N times after the image signals for predetermined lines fewer than the image signals for one frame among the image signals for one frame are generated. In this case, displaying starts without waiting for the image signals for one frame to be generated. Therefore, a delay between imaging and displaying can be shortened. Here, in the storage unit, it is preferable that the image signals for predetermined lines be set such that reading-out the image signal does not overtake reading-out the image signal. Moreover, it is preferable that the image signals for predetermined lines be equivalent to (N−1)/N.

There is provided an image signal output portion that reads out the image signal from the storage unit and supplies the image signal to the display unit. Corresponding to the imaging signals for one frame, in the first reading-out among reading out the same image signal N times from the storage unit, the image output portion may read out the image signal from the storage unit in accordance with the progress information indicating the progress of the image processing. In the second reading-out and thereafter, image signal output portion may continuously read out the image signal in each of the lines and may output the read out image signal to the display unit.

According to the aspect, since it takes time to perform the image processing, the first reading-out of the image signal is executed in accordance with the progress of the image processing. However, in the second time and thereafter, since the image signal in each of the lines is continuously read out, the delay time between imaging and displaying can be shortened.

In the aspect of the imaging display apparatus described above, a timing control unit that outputs a horizontal synchronizing signal and a vertical synchronizing signal to the display unit is further provided. After displaying is performed N times, in a case where the image signals for predetermined lines fewer than the image signals for one frame among the image signals for one frame to be displayed in one succeeding frame are not generated, it is preferable that outputting the vertical synchronizing signal be delayed until the image signals for predetermined lines are generated.

According to the aspect, when an image signal of a certain frame is generated, the image signal is displayed N times. However, in a case where the image processing of the next frame is not progressed to a predetermined line at the point of time the display is completed, outputting the vertical synchronizing signal is delayed. Accordingly, the vertical synchronizing signal can be output at the point of time the image processing proceeds to a predetermined line. As a result thereof, while the operations of the imaging unit and the display unit are synchronized with each other, a delay between imaging and displaying can be shortened.

In the aspect of the imaging device, it is preferable that the timing control unit output a dummy horizontal synchronizing signal while outputting the vertical synchronizing signal is delayed. According to the aspect, the duration of a horizontal scanning period becomes uniform, and the operations of the imaging unit and the display unit can be synchronized with each other with the accuracy of the horizontal scanning period.

According to the aspect, with the accuracy of the horizontal scanning period set based on a horizontal synchronizing pulse, the timing of outputting the image signal in each of the lines can be controlled. Therefore, even in a case where a time for the image processing required in generating the image signal fluctuates for each line, at the timing corresponding to the time for the image processing for each line, the image signal in each of the lines can be output with respect to the display unit.

In the aspect of the imaging device, it is preferable that the second frame rate be a frame rate which is N times the first frame rate. In this case, since the frame rates of the imaging unit and the display unit have a relationship of integer multiplication, when the image signal subjected to the image processing is displayed N times, the operations of the imaging unit and the display unit can be synchronized with each other.

In the aspect of the imaging device, it is preferable that the second frame rate be as much greater than the frame rate which is N times the first frame rate as one to several fps. According to the aspect, the second frame rate becomes slightly higher than N times the first frame rate. Accordingly, even in a case where the time required for the image processing fluctuates, the fluctuation can be absorbed. Meanwhile, when the second frame rate becomes greater than the frame rate which is N times the first frame rate, a time for holding an image in the display unit becomes gradually elongated in accordance therewith. Depending on the degree thereof, there is concern regarding a flicker or deterioration of image quality. However, as long as the second frame rate has the degree of being slightly higher than N times the first frame rate, there is no such disadvantage.

DESCRIPTION OF EMBODIMENTS

Exemplary embodiments of the present invention will be described with reference to the drawings. However, in each of the drawings, the measurements and the scale of each of the units and portions suitably differ from the actual measurements and the actual scale. In addition, since the embodiments described below are specific examples favorable for the present invention, various types of technically preferable limitation are applied thereto. Nevertheless, the scope of the present invention is not limited to those embodiments unless there is a disclosure particularly limiting the present invention in the description below.

A. First Embodiment

Hereinafter, an imaging display apparatus 1 according to a first embodiment of the present invention will be described.

<A-1: Configuration of Imaging Display Apparatus>

Figure 1:
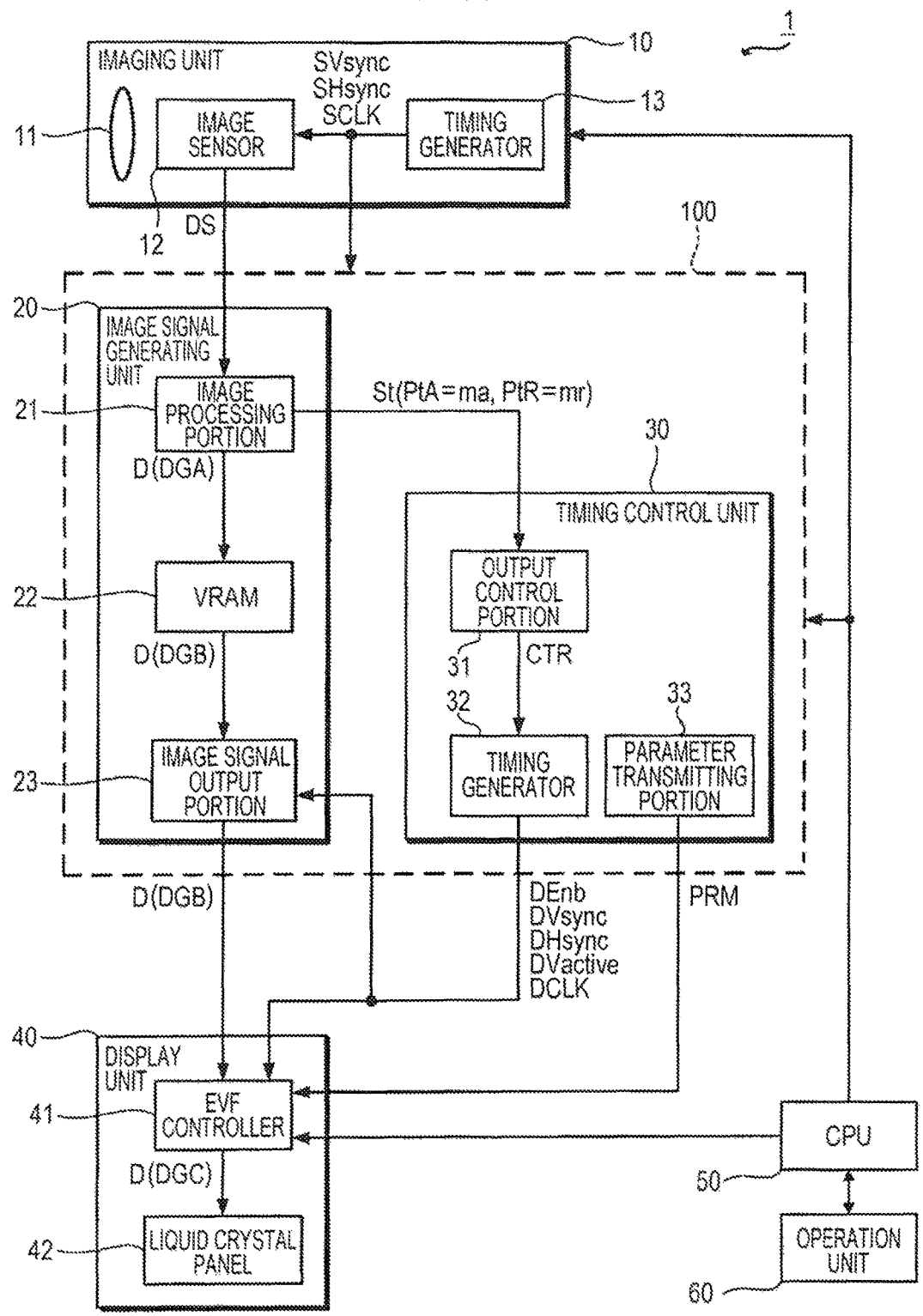
FIG. 1 is a block diagram illustrating a configuration of an imaging display apparatus 1, according to a first embodiment of the present invention.

FIG. 1 is a block diagram illustrating a function of the imaging display apparatus 1.

As illustrated in FIG. 1, the imaging display apparatus 1 includes an imaging unit 10 that images a subject and outputs data obtained through the imaging, as an imaging signal DS; an image processing circuit 100 that performs image processing with respect to the imaging signal DS and generates an image signal D; a display unit 40 that displays an image corresponding to the image signal D; an operation unit 60 for inputting a change of set status of the imaging display apparatus 1, an imaging instruction, and the like; and a CPU 50 that controls the operation of the imaging display apparatus 1 in its entirety.

The imaging display apparatus 1 is a so-called mirrorless digital camera. A user of the imaging display apparatus 1 operates the operation unit 60 and can make a selection between an operation performed in a live view mode in which the display unit 40 displays an image related to a subject imaged by the imaging unit 10 in substantially real time, and an operation performed in an imaging mode in which a memory card (not illustrated) for storing still images stores an image related to a subject imaged by the imaging unit 10, as a still image.

The imaging unit 10, the image processing circuit 100, the operation unit 60, and the CPU 50 of the imaging display apparatus 1 from which the display unit 40 is excluded configure an example of "an imaging device".

The imaging unit 10 includes an imaging optical system 11 through which an image of a subject is subjected to image-forming, an image sensor 12 which performs line-sequential scanning with respect to a signal from light receiving elements (imaging elements) arrayed in a matrix state and outputs the imaging signal DS corresponding to the image of the subject, and a timing generator 13 which outputs various types of timing signals to the image sensor 12.

Figure 2:
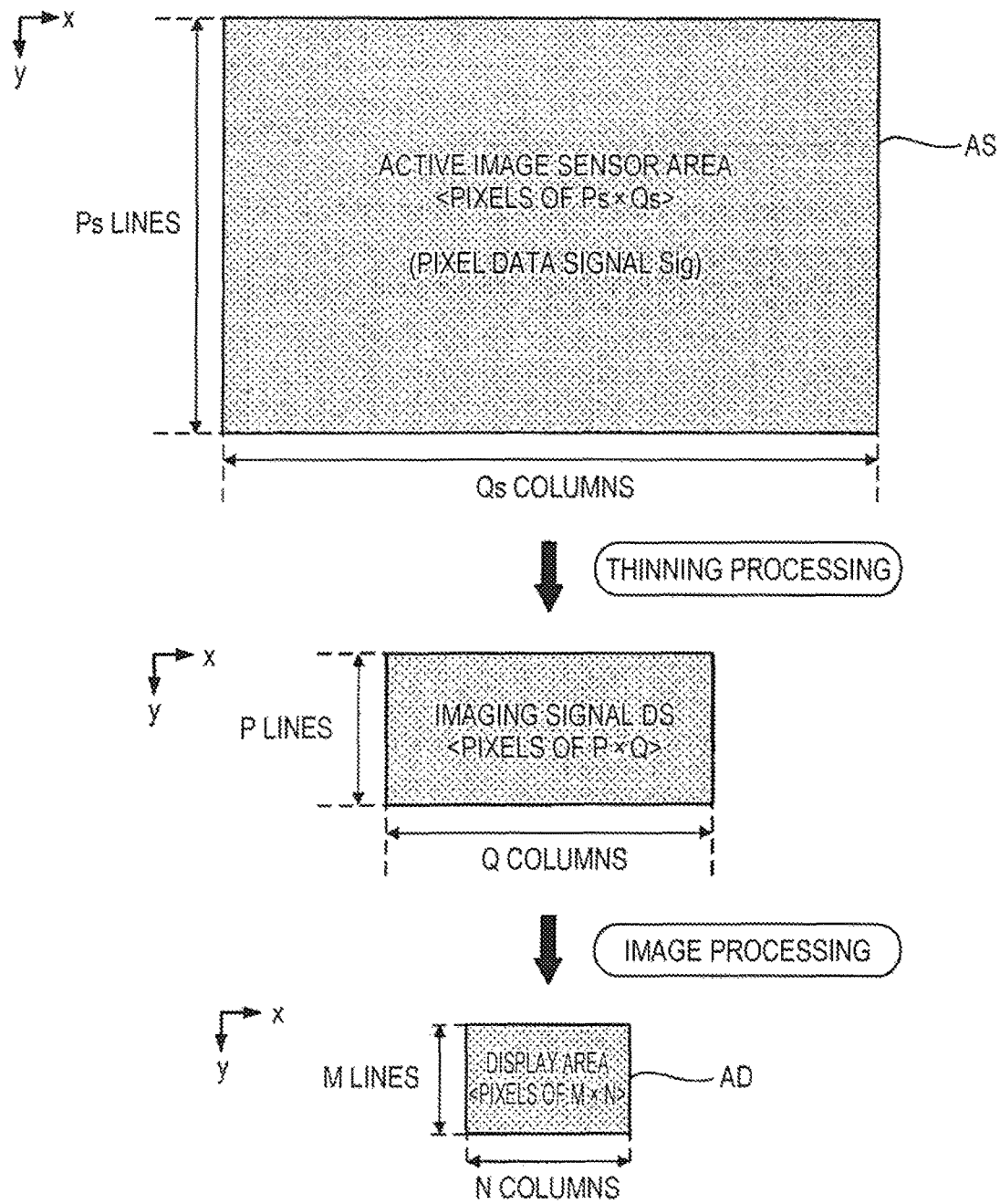
FIG. 2 is a view for describing a relationship between an active image sensor area AS and a display area AD.

As illustrated in FIG. 2, in an active image sensor area AS of the image sensor 12, multiple light receiving elements are arrayed in a matrix state so as to have QS columns in an X-axis direction (horizontal direction) and PS rows (PS line) in a Y-axis direction (vertical direction) intersecting the X-axis direction (PS and QS are natural numbers equal to or greater than 2). In other words, the active image sensor area AS is configured to have PS rows of lines in each of which QS light receiving elements are arrayed in the X-axis direction are arranged in the Y-axis direction.

Each of the light receiving elements generates a pixel data signal Sig corresponding to the detected intensity of light.

In addition, color filters each of which is any one of red, green, and blue are provided in a plaid pattern so as to respectively correspond to the light receiving elements in a one-to-one manner. Hereinafter, a set of one light receiving element and a color filter provided so as to correspond to the one light receiving element is sometimes referred to as a pixel of the image sensor 12.

In a case where the imaging display apparatus 1 operates in the imaging mode, the image sensor 12 can output all of the pixel data signals Sig which are output from the light receiving elements of PS rows×QS columns provided in the active image sensor area AS, as imaging data for a still image. When the imaging data for a still image is output, an image processing portion 21 (described below) generates still image data by performing various types of image processing such as filter processing with respect to the imaging data for a still image and stores the generated still image data in the memory card for storing still images.

Meanwhile, in a case where the imaging display apparatus 1 operates in the live view mode, the image sensor 12 performs thinning processing with respect to the pixel data signals Sig which are output by the light receiving elements of PS rows×QS columns, such that data of the pixel data signals Sig is reduced in size, thereby outputting the data as the imaging signal DS corresponding to pixels of P rows×Q columns, as illustrated in FIG. 2 (P is a natural number satisfying 2≤P≤PS, and Q is a natural number satisfying 2≤Q≤QS).

The image sensor 12 may include a pixel in an area other than the active image sensor area AS. However, in this specification, for simplification, description regarding the pixel in the active image sensor area AS will be omitted.

The timing generator 13 generates an imaging vertical synchronizing signal SVsync, an imaging horizontal synchronizing signal SHsync, and an imaging dot clock signal SCLK and outputs these generated signals with respect to the image sensor 12 and the image processing circuit 100.

Figure 3:
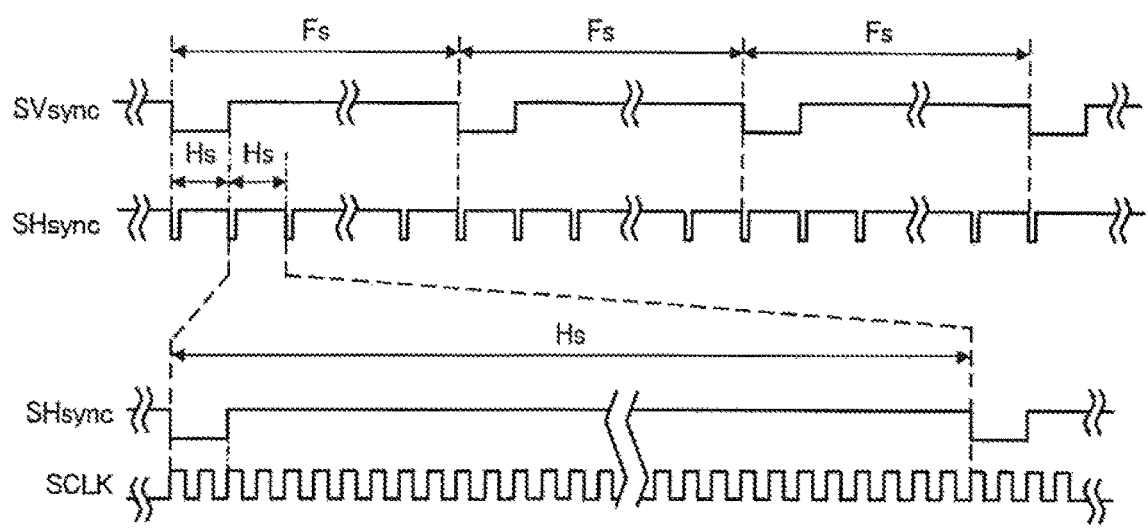
FIG. 3 is a timing chart for describing an operation of the imaging display apparatus 1.

FIG. 3 is a timing chart for describing the imaging vertical synchronizing signal SVsync, the imaging horizontal synchronizing signal SHsync, and the imaging dot clock signal SCLK which are generated by the timing generator 13. The imaging vertical synchronizing signal SVsync is a signal which defines a vertical scanning period Fs for reading out the pixel data signal Sig from the light receiving elements of the active image sensor area AS in its entirety (for the PS lines) of the image sensor 12. The imaging horizontal synchronizing signal SHsync is a signal which defines a horizontal scanning period Hs for reading out the pixel data signal Sig from the light receiving elements for one line of the active image sensor area AS. The imaging dot clock signal SCLK is a signal which defines timing for reading out the pixel data signal Sig from the light receiving elements for one pixel of the active image sensor area AS.

The duration of the vertical scanning period Fs is uniform (fixed duration), and the duration of the horizontal scanning period Hs is also uniform (fixed duration). In addition, the vertical scanning period Fs is configured to include multiple horizontal scanning periods Hs.

Description returns to FIG. 1. The display unit 40 is an electronic view finder (EVF) for allowing a user of the imaging display apparatus 1 to grasp the state of a subject by displaying an image showing the subject which becomes an imaging target. The display unit 40 includes a liquid crystal panel 42 for displaying an image corresponding to the image signal D which is generated by the image processing circuit 100, and an EVF controller 41 which controls the operation of the liquid crystal panel 42.

As illustrated in FIG. 2, in a display area AD of the liquid crystal panel 42, multiple pixels are arrayed in a matrix state so as to form N columns in the X-axis direction and M rows (M lines) in the Y-axis direction (M is a natural number satisfying 2≤M≤P, and N is a natural number satisfying 2≤N≤Q). In other words, the display area AD is configured to have M rows of lines in each of which N pixels are arrayed in the X-axis direction are arranged in the Y-axis direction. These pixels of M rows×N columns include pixels for displaying red, pixels for displaying green, and pixels for displaying blue. In the display area AD, an image corresponding to the image signal D generated by the image processing circuit 100 is displayed.

As described above, M≤P and N≤Q. That is, there may be a case where the number of active pixels provided in the active image sensor area AS and the numbers of pixels provided in the display area AD are different from each other.

The coordinate systems illustrated in FIG. 2 are respectively a coordinate system fixed to the active image sensor area AS, a conceptual coordinate system for indicating the imaging signal DS, and a coordinate system fixed to the display area AD. The orientations of axes in the three coordinate systems are different from each other.

The duration of one frame in which the display area AD of the display unit 40 can display images for one screen is shorter than the duration of one frame in which the imaging unit 10 can image images for one screen. In the present embodiment, it is presumed that the frame rate of the imaging signal DS output from the imaging unit 10 is 30 fps, and the frame rate of the image signal D supplied to the display unit 40 is 60 fps which is twice the frame rate of the imaging signal DS.

As illustrated in FIG. 1, the image processing circuit 100 includes an image signal generating unit 20 which generates the image signal D based on the imaging signal DS and outputs the generated image signal D to the display unit 40, and a timing control unit 30 which controls timing the image signal generating unit 20 outputs the image signal D.

The image signal generating unit 20 includes the image processing portion 21 which performs image processing with respect to the imaging signal DS so as to generate the image signal D, a VRAM 22 which temporarily stores the image signal D generated by the image processing portion 21, and an image signal output portion 23 which acquires the image signal D from the VRAM 22 so as to output the acquired image signal D to the display unit 40. The VRAM 22 has a storage capacity for at least two frames (it is desirable to have a storage capacity for approximately four frames). The image signal generating unit 20 can write the image signal D in the VRAM 22 and can read out the image signal D from the VRAM 22.

The image signal D is a signal which defines an image (tone) to be displayed by each of the pixels of M rows×N columns provided in the display area AD of the liquid crystal panel 42. Hereinafter, among the image signals D indicating images to be displayed in the display area AD, the image signal D for one line indicating an image to be displayed in the line of the mth row in the display area AD will be expressed as an image signal D[m] (m is a natural number satisfying 15 mM).

The image processing portion 21 generates the image signals D indicating image to be displayed in the display area AD of the liquid crystal panel 42, for each image to be displayed in pixels for one line. More specifically, the image processing portion 21 generates the image signals D in the order of an image signal D[1], the image signal D[2], and so on to the image signal D[M], thereby storing the image signals D in the VRAM 22. The image processing executed by the image processing portion 21 will be described later in detail.

In addition, the image processing portion 21 generates a state signal St indicating the state of the image processing and outputs the state signal St to the timing control unit 30. The state signal St according to the present embodiment includes an image processing completion signal PtA indicating that storing the image signal D[m] generated by the image signal processing portion 21 in the VRAM 22 is completed.

In the present embodiment, the imaging signal DS corresponds to pixels of P rows×Q columns illustrated in FIG. 2. Therefore, a line number mr is a natural number satisfying 1≤mr≤P. Meanwhile, the image processing completion signal PtA is a signal indicating a line number ma corresponding to the image signal D of which writing in the VRAM 22 by the image processing portion 21 is completed (ma is a natural number satisfying 1≤ma≤M). The line number ma which is a value indicated by the image processing completion signal PtA is an example of "image processing completion line information" expressing a line of which the image processing is completed.

The image processing completion signal PtA is not limited to a signal indicating the line number and may be signals of two values including pulse waveforms rising to a high level in a case where generating the image signal D[m] by the image processing portion 21 is completed. In a case where the image processing completion signal PtA is the signal of two values, the timing control unit 30 favorably computes the line number of the image signal D[m] of which generation performed by the image processing portion 21 is completed, for example, by counting the number of pulses included in the image processing completion signal PtA after one screen starts to be displayed. In this case, the pulse waveforms (or the number of pulse waveforms) included in the image processing completion signal PtA correspond to "the image processing completion line information". In addition, the image processing completion line information corresponds to progress information indicating the degree of the progress of the image processing.

The image signal output portion 23 reads out the image signal D from the VRAM 22 for each line in accordance with controlling of the timing control unit 30 and outputs the image signal D[m] read out for one line, to the display unit 40.

Hereinafter, in a case where there is a need of distinguishment for convenience of description, the image signal D which is generated and is stored in the VRAM 22 by the image processing portion 21 will be referred to as an image signal DGA, and the image signal D which is acquired from the VRAM 22 and is output to the display unit 40 by the image signal output portion 23 will be referred to as an image signal DGB. In addition, among the image signal DGA which are stored in the VRAM 22 by the image processing portion 21, the image signal DGA indicating an image to be displayed in the line of the mth row in the display area AD will be referred to as an image signal DGA[m], and among the image signals DGB which are output to the display unit 40 by the image signal output portion 23, the image signal DGB indicating an image to be displayed in the line of the mth row in the display area AD will be referred to as an image signal DGB[m].

As illustrated in FIG. 1, the timing control unit 30 includes an output control portion 31 which generates an output control signal CTR based on the state signal St, a timing generator 32 which controls timing various types of timing signals are generated and the image signal output portion 23 outputs the image signal DGB[m], and a parameter transmitting portion 33 which transmits a setting parameter PRM defining the operation of the EVF controller 41 to the EVF controller 41.

Based on the output control signal CTR, the timing generator 32 generates a display vertical synchronizing signal DVsync, a vertical active data signal DVactive, a display horizontal synchronizing signal DHsync, a display dot clock signal DCLK, and an enable signal DEnb. The timing generator 32 outputs these generated signals to the image signal output portion 23 and the display unit 40.

Based on the state signal St, the output control portion 31 determines whether or not preparation of the image signal output portion 23 for outputting the image signal D[m] (image signal DGB[m]) indicating an image to be displayed in the mth row in the display area AD to the display unit 40 is completed. The output control portion 31 generates the output control signal CTR indicating the determination result.

As described above, in the present embodiment, the frame rate of the imaging signal DS is 30 fps and the frame rate of the image signal DGB is 60 fps. Therefore, the output control portion 31 controls the timing of the image signal DGB to be read out from the VRAM 22, and thus, the operation of the imaging unit 10 and the operation of the display unit 40 are synchronized with each other.

Regarding aspects in which the output control portion 31 of the present embodiment generates the output control signal CTR, that is, aspects in which the display unit 40 performs displaying based on the image signal DGB, there are a first aspect and a second aspect, which will be described below.

The first aspect is an aspect in which after the image signals DGB for one frame generated based on the imaging signal DS from the imaging unit 10 is stored in the VRAM 22, the display unit 40 starts displaying N (N is an integer equal to or greater than 2) times based on the image signal DGB stored in the VRAM 22. The second aspect is an aspect in which after the image signal DGB generated based on the imaging signal DS from the imaging unit 10 is equivalent to remaining 1/N frames, displaying starts N times based on the image signal DGB stored in the VRAM 22.

The integer N is set based on the frame rate of the imaging unit 10 and the frame rate of the display unit 40 associated therewith. For example, twice, three times, and four times may be applied.

Specifically, in a case where the frame rate of the imaging signal DS output from the imaging unit 10 is 30 fps and the frame rate of the image signal D supplied to the display unit 40 is equal to or greater than 60 fps which is twice the frame rate (=30×2 fps) of the imaging signal DS (in a case of an operation at twice the rate), in the first aspect, after an image signal DGB1 for one frame generated based on an imaging signal DS1 from the imaging unit 10 is stored in the VRAM 22, the display unit 40 performs displaying twice based on the image signal DGB1 stored in the VRAM 22. In the second aspect, when the remaining generation processing of the image signals DGB1 for one frame based on the imaging signal DS1 from the imaging unit 10 becomes equal to or less than 50% (½), displaying is performed twice based on the image signal DGB1 stored in the VRAM 22. It is favorable that the frame rate of the display unit 40 is a frame rate slightly faster than 60 fps, such as 61 fps. The reason for setting the frame rate to be slightly high is that in a case where if a frame rate Y of the display unit 40 is slightly lower than N times a frame rate X of the imaging unit 10, the display unit 40 cannot display the same image N times with respect to the vertical scanning period FS of the imaging signal DS.

In addition, in a case where the frame rate of the imaging signal DS output from the imaging unit 10 is 24 fps and the frame rate of the image signal D supplied to the display unit 40 is equal to or greater than 72 fps which is three times the frame rate (=24×3 fps) of the imaging signal DS (in a case of an operation at three times the rate), in the first aspect, after the image signal DGB1 for one frame generated based on the imaging signal DS1 from the imaging unit 10 is stored in the VRAM 22, the display unit 40 performs displaying three times based on the image signal DGB1 stored in the VRAM 22. In the second aspect, when the remaining generation processing of the image signals DGB1 for one frame based on the imaging signal DS1 from the imaging unit 10 becomes equal to or less than 33% (⅓), displaying is performed three times based on the image signal DGB1 stored in the VRAM 22. As described above, it is favorable that the frame rate of the display unit 40 is a frame rate slightly faster than 72 fps, such as 73 fps.

In addition, in a case where the frame rate of the imaging signal DS output from the imaging unit 10 is 24 fps and the frame rate of the image signal D supplied to the display unit 40 is equal to or greater than 96 fps which is four times the frame rate (=24×4 fps) of the imaging signal DS (in a case of an operation at four times the rate), in the first aspect, after the image signal DGB1 for one frame generated based on the imaging signal DS1 from the imaging unit 10 is stored in the VRAM 22, the display unit 40 performs displaying four times based on the image signal DGB1 stored in the VRAM 22. In the second aspect, when the remaining generation processing of the image signals DGB1 for one frame based on the imaging signal DS1 from the imaging unit 10 becomes equal to or less than 25% (¼), displaying is performed three times based on the image signal DGB1 stored in the VRAM 22. As described above, it is favorable that the frame rate of the display unit 40 is a frame rate slightly faster than 96 fps, such as 97 fps.

In a case of the first aspect, in a case where the line number ma indicated by the image processing completion signal PtA matches "M", the output control portion 31 determines that preparation for outputting the image signals D[1] to D[M] with respect to N frames is completed, thereby causing the output control signal CTR to be active (high level). That is, after image processing with respect to the imaging signal DS for one frame is completed, the output control signal CTR is generated such that the same image signal DGB can be read out N times from the VRAM 22. Accordingly, after the image signals DGA for one frame is generated, the display unit 40 performs displaying N times based on the image signals DGA for one frame. In this case, it is preferable that the frame rate of the display unit 40 be as much greater than the frame rate which is N times the frame rate of the imaging unit 10 as one to several fps.

Figure 4:
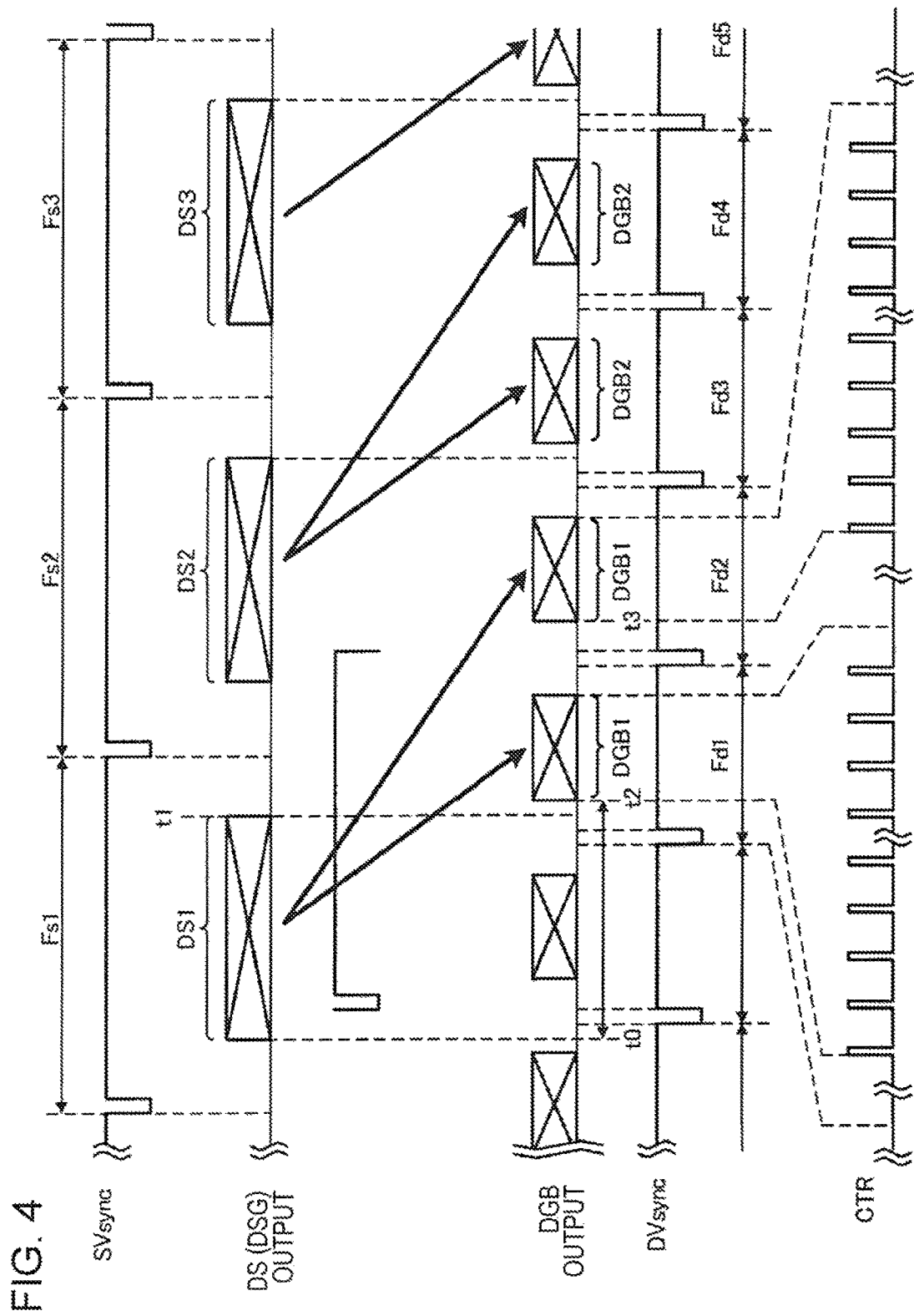
FIG. 4 is a timing chart for describing an operation of the imaging display apparatus 1.

FIG. 4 is a timing chart illustrating a relationship between the imaging signal DS and the image signal DGB in the first aspect in a case of an operation operated at twice the rate as described above. In FIG. 4, the image signal DGB1 is generated by performing signal processing with respect to the imaging signal DS1, and an image signal DGB2 is generated by performing signal processing with respect to an imaging signal DS2. In this example, in the image signal generating unit 20, reading of the imaging signal DS1 for one frame output in a vertical scanning period Fs1 is completed at a time t1. The imaging signal DS1 is subjected to the image processing and is written in the VRAM 22. The image signal DGB1 is read out from the VRAM 22 from a time t2 in a vertical scanning period Fd1. Moreover, the image signal DGB1 is read out again from the VRAM 22 from a time t3 in a vertical scanning period Fd2. In this case, displaying is delayed as much as the time from a time t0 the imaging signal DS1 starts in the vertical scanning period Fs1 to the time t2. However, in the vertical scanning period Fd2, since the image signal DGB1 is already stored in the VRAM 22, the operation of the display unit 40 can be synchronized with the operation of the imaging unit 10.

Meanwhile, in a case of the second aspect, in a case where the line number ma indicated by the image processing completion signal PtA matches "K", the output control portion 31 determines that preparation for outputting the image signals D[1] to D[M] with respect to a certain frame and the next frame thereof is completed, thereby causing the output control signal CTR to be active. Accordingly, after the image signals DGA for predetermined lines fewer than the image signals for one frame among the image signals DGA for one frame are generated, the display unit 40 starts to perform displaying N times.

In this case, the image processing has ended to only a Kth line, and "K" is a natural number satisfying 1≤K≤M. In the VRAM 22, K is set such that reading-out the image signal DGB does not to overtake writing the image signal DGA.

For example, in a case where the image signal DGB obtained by performing image processing with respect to the imaging signal DS of one frame is read out N times from the VRAM 22 (N is a natural number equal to or greater than 2), in a case where the loads of the image processing for each line can be presumed to be substantially the same as each other, K may be set to K=M×(N−1)/N. In the image processing of the imaging signal DS of one frame, since the image signals DGB for M lines are generated, "M×(N−1)/N" denotes that the remaining image processing of the imaging signal DS for one frame becomes 1/N. On the other hand, in a case where the loads of the image processing for each line are different from each other due to processing such as distortion aberration correction, the value of a line in which the remaining image processing of the imaging signal DS for one frame becomes 1/N may be set to K. The point is that the image signal DGB can be smoothly read out from the VRAM 22 by setting K such that reading-out the image signal DGB does not overtake writing the image signal DGA. In the second aspect, compared to the first aspect, a delay time between imaging and displaying can be shortened.

Figure 5:
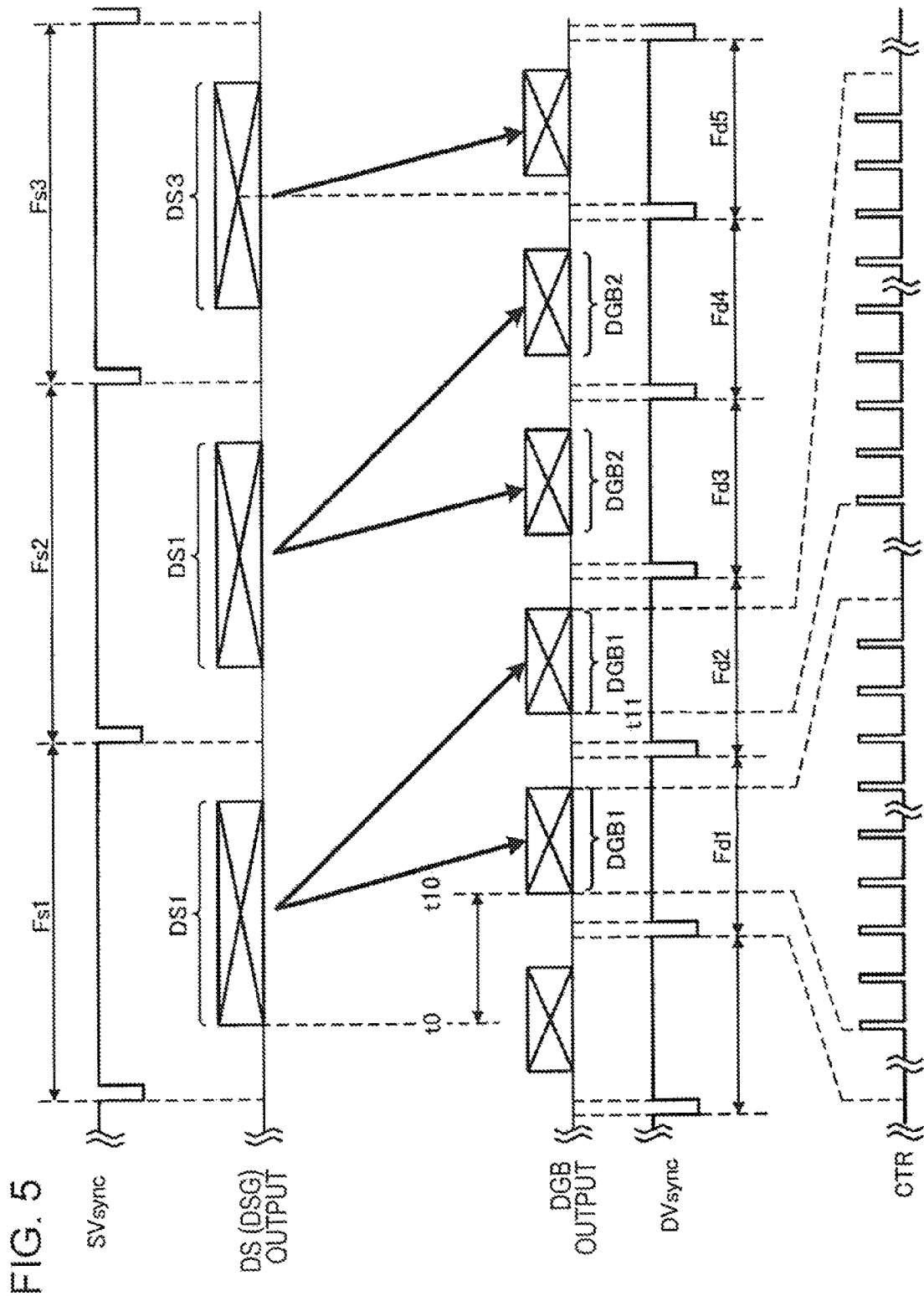
FIG. 5 is a timing chart for describing an operation of the imaging display apparatus 1.

FIG. 5 is a timing chart illustrating a relationship between the imaging signal DS and the image signal DGB in the second aspect in a case of an operation operated at twice the rate as described above. In this example, in the image signal generating unit 20, it is presumed that the image processing of the imaging signal DS1 in the Kth line output in the vertical scanning period Fs1 is completed at a time t10 and writing of an image signal DGA[K] in the VRAM 22 is completed. In this case, the image signal DGB1 is read out from the VRAM 22 from the time t10 in the vertical scanning period Fd1. Moreover, the image signal DGB1 is read out from the VRAM 22 from a time t11 in the vertical scanning period Fd2. In this case, displaying is delayed as much as the time from the time t0 the imaging signal DS1 starts in the vertical scanning period Fs1 to the time t10. However, in the second aspect, before reading the image signal DS1 is completed, the image signal DGB1 is read out from the VRAM 22. Therefore, compared to the first aspect, the delay time between imaging and displaying can be shortened.

Figure 6A:
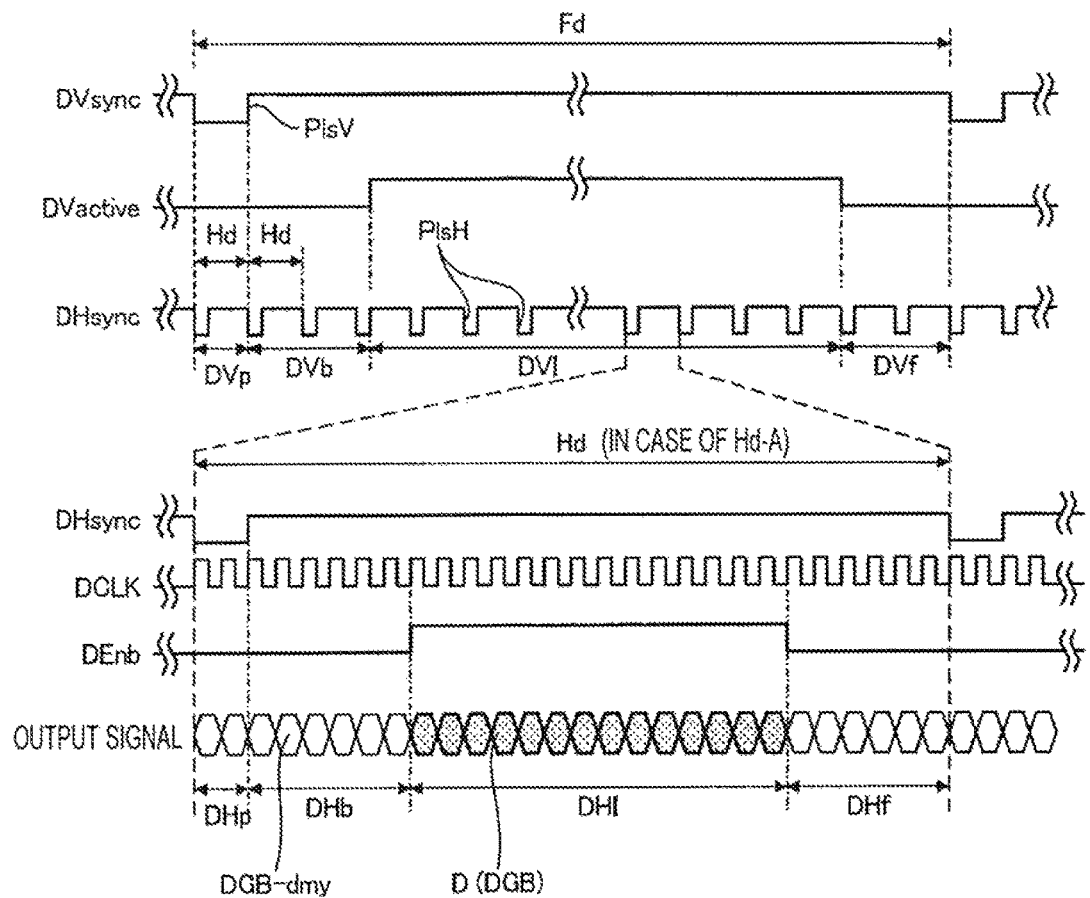
FIG. 6A is a timing chart for describing an operation of the imaging display apparatus 1.
Figure 6B:
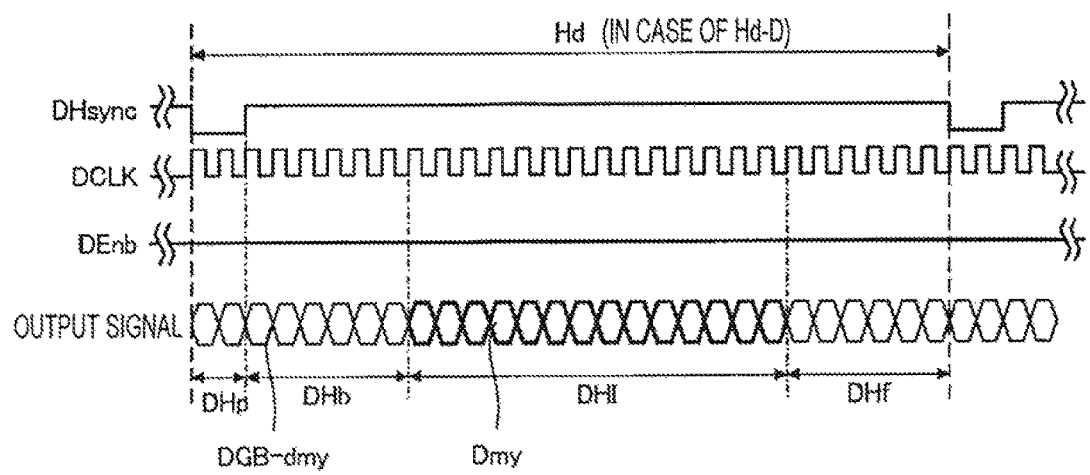
FIG. 6B is a timing chart for describing an operation of the imaging display apparatus 1.

FIG. 6A is a timing chart for describing the display vertical synchronizing signal DVsync, the vertical active data signal DVactive, the display horizontal synchronizing signal DHsync, the display dot clock signal DCLK, and the enable signal DEnb which are generated by the timing generator 32. In addition, FIG. 6B is a timing chart for describing the display horizontal synchronizing signal DHsync, the display dot clock signal DCLK, and the enable signal DEnb in an inactive horizontal scanning period Hd-D.

As illustrated in FIG. 6A, the display vertical synchronizing signal DVsync is a signal which defines a vertical scanning period Fd for displaying an image with pixels in the display area AD in its entirety (for M lines) of the liquid crystal panel 42. The display horizontal synchronizing signal DHsync is a signal which defines a horizontal scanning period Hd for displaying an image with pixels for one line in the display area AD. The display dot clock signal DCLK is a signal which defines timing for displaying an image with each of the pixels in the display area AD.

In the present embodiment, the horizontal scanning period Hd has a uniform duration which is set in advance. In addition, in the present embodiment, the vertical scanning period Fd is configured to have the multiple horizontal scanning periods Hd and has a uniform duration which is set in advance. In the waveforms included in the display vertical synchronizing signal DVsync, a pulsatile waveform which defines the timing of the start and the end of the vertical scanning period Fd will be referred to as a vertical synchronizing pulse PlsV. In addition, in the waveforms included in the display horizontal synchronizing signal DHsync, a pulsatile waveform which defines the timing of the start and the end of the horizontal scanning period Hd will be referred to as a horizontal synchronizing pulse PlsH.

As illustrated in FIG. 6A, the vertical scanning period Fd includes a vertical synchronizing period DVp, a vertical back porch period DVb, a vertical active data period DVI, and a vertical front porch period DVf.

The vertical synchronizing period DVp is a period in which the display vertical synchronizing signal DVsync becomes active (in the example of FIG. 6A, a low level) and is a period which starts at the same time as the vertical scanning period Pd starts and has duration set in advance. The vertical back porch period DVb is a period succeeding the vertical synchronizing period DVp and is a period having duration set in advance. Moreover, the vertical active data period DVI in the first embodiment is a period succeeding the vertical back porch period DVb and having duration set in advance.

In the corresponding vertical active data period DVI, the image signals DGB (image signals DGB[1] to DGB[M]) are output from the image signal output portion 23. The vertical front porch period DVf is a period succeeding the vertical active data period DVI and is a period which ends at the same time as the vertical scanning period Fd ends and has duration set in advance.

The vertical active data period DVI is a period from the start of the horizontal scanning period Hd at which the enable signal DEnb becomes active first in the vertical scanning period Fd to the end of the horizontal scanning period Hd at which the enable signal DEnb becomes active for the Mth time (a case where the enable signal DEnb becomes active will be described later).

For example, the corresponding vertical active data period DVI is favorably set based on a count value output by a counter (not illustrated) which counts the number of times in which the enable signal DEnb becomes active. However, in the present embodiment, for the convenience of description, the vertical active data signal DVactive which becomes active (in the example of FIG. 6A, a high level) in a period from the start of the horizontal scanning period Hd at which the enable signal DEnb becomes active first in each vertical scanning period Pd the end of the horizontal scanning period Hd at which the enable signal DEnb becomes active for the Mth time is introduced. That is, in the present embodiment, the period in which the vertical active data signal DVactive is active will be described as the vertical active data period DVI. The vertical active data signal DVactive is a signal which is introduced for the convenience of description, and the output control portion 31 may not output the vertical active data signal DVactive.

As illustrated in FIG. 6A, the horizontal scanning period Hd includes a horizontal synchronizing period DHp, a horizontal back porch period DHb, a horizontal active data period DHI, and a horizontal front porch period DHf.

The horizontal synchronizing period DHp is a period in which the display horizontal synchronizing signal DHsync becomes active (in the example of FIG. 6A, a low level) and is a period which starts at the same time as the horizontal scanning period Hd starts and has duration set in advance. The horizontal back porch period DHb is a period succeeding the horizontal synchronizing period DHp and is a period having duration set in advance. The horizontal active data period DHI is a period succeeding the horizontal back porch period DHb and having duration set in advance. The horizontal front porch period DHf is a period succeeding the horizontal active data period DHI and is a period which ends at the same time as the horizontal scanning period Hd ends and has duration set in advance.

In the horizontal scanning period Hd, an active horizontal scanning period Hd-A (refer to FIG. 6A) in which the image signal output portion 23 outputs the image signal D[m], and the inactive horizontal scanning period Hd-D (refer to FIG. 6B) for outputting an inactive signal Dmy[m] instead of outputting the image signal D[m] are present.

FIG. 6A illustrates an example of a case where the horizontal scanning period Hd is the active horizontal scanning period Hd-A. As illustrated in FIG. 6A, in a case where the horizontal scanning period Hd is the active horizontal scanning period Hd-A, the enable signal DEnb becomes active in the horizontal active data period DHI (in the example of FIG. 6A, a high level). In the horizontal active data period DHI in which the enable signal DEnb becomes active, the image signal D[m] (image signal DGB[m]) is output from the image signal output portion 23.

Meanwhile, the enable signal DEnb becomes non-active in the periods (horizontal synchronizing period DHp, horizontal back porch period DHb, and horizontal front porch period DHf) other than the horizontal active data period DHI in the active horizontal scanning period Hd-A. The image signal output portion 23 stops outputting the image signal D[m] (image signal DGB[m]) in a period other than the horizontal active data period DHI in the active horizontal scanning period Hd-A, in which the enable signal DEnb becomes non-active, thereby outputting an inactive line signal DGB-dmy.

In addition, in the present embodiment, in the vertical scanning period Fd, the horizontal scanning period Hd in the periods (vertical synchronizing period DVp, vertical back porch period DVb, and vertical front porch period DVf) excluding the vertical active data period DVI is the inactive horizontal scanning period Hd-D. In the inactive horizontal scanning period Hd-D, the enable signal DEnb becomes non-active and the inactive line signal DGB-dmy is output.

Figure 7:
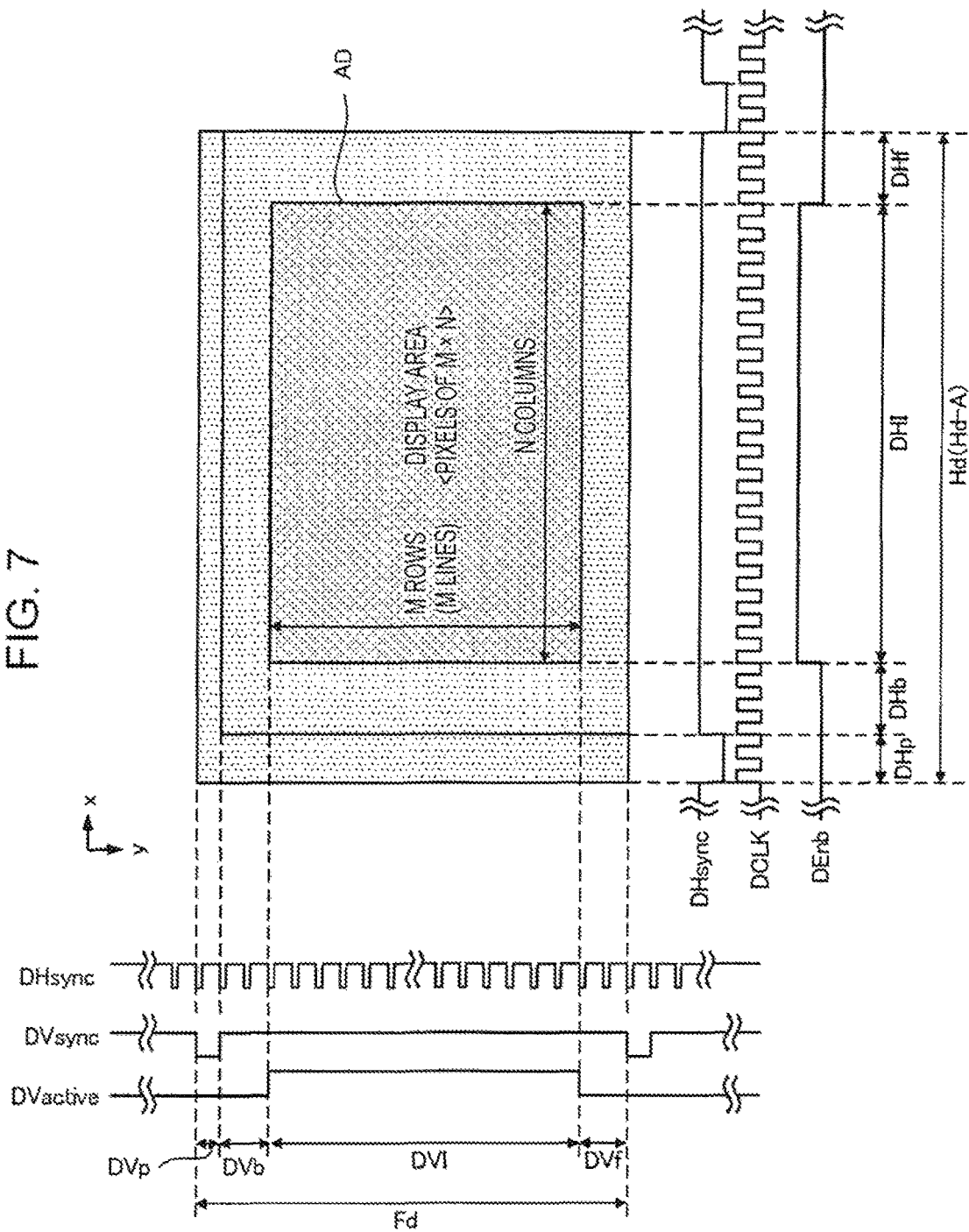
FIG. 7 is a view for describing the display area AD.

FIG. 7 is a view for describing a relationship between various types of signals generated by the timing generator 32, and timing of displaying an image in the display area AD of the liquid crystal panel 42.

As illustrated in FIG. 7, the pixels of M rows×N columns from the line of the first row included in the display area AD to the line of the Mth row display images for one screen indicated by the image signals D[1] to D[M] in the vertical active data period DVI in which the vertical active data signal DVactive becomes active in the vertical scanning period Fd.

In addition, N pixels configuring the line of the mth row in the display area AD display images indicated by the image signal D[m] in the horizontal active data period DHI in which the enable signal DEnb becomes active in the horizontal scanning period Hd (active horizontal scanning period Hd-A).

Subsequently, with reference to FIG. 8, the display unit 40 will be described.

Figure 8:
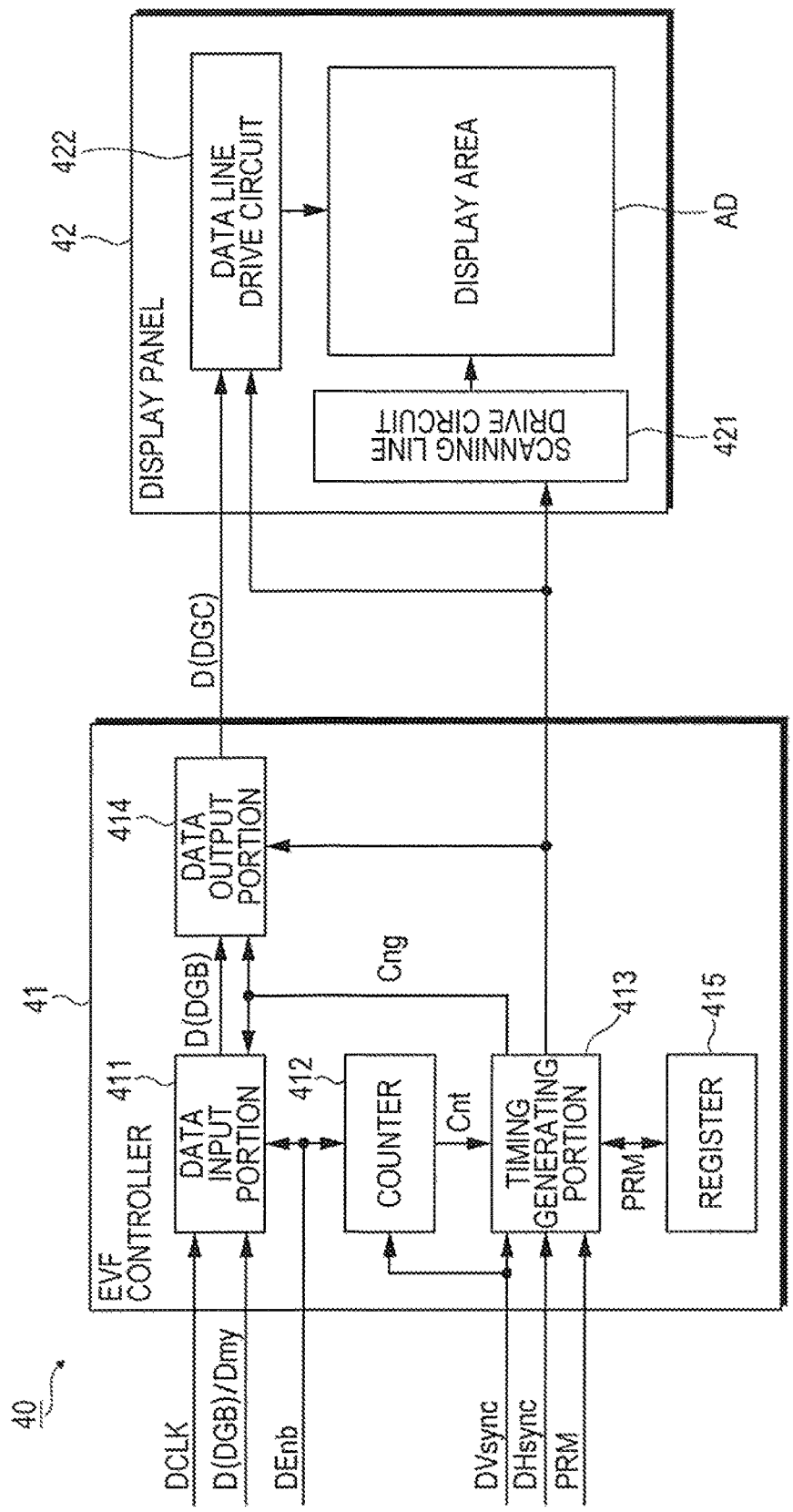
FIG. 8 is a block diagram illustrating a configuration of a display unit 40.

FIG. 8 is a block diagram illustrating a configuration of the display unit 40. As described above, the display unit 40 includes the EVF controller 41 which controls the operation of the liquid crystal panel 42, and the liquid crystal panel 42 for displaying an image corresponding to the image signal D.

As described above, the liquid crystal panel 42 is provided with the display area AD for displaying an image corresponding to the image signal D. The display area AD is configured to include scanning lines of M rows extending in the X-axis direction, data lines of N columns extending in the Y-axis direction, and pixels of M rows×N columns provided so as to correspond to the intersections of the scanning lines and the data lines (refer to FIG. 7). In addition, the liquid crystal panel 42 includes a scanning line drive circuit 421 for selecting a scanning line, a data line drive circuit 422 for driving a data line, and an optical system (not illustrated) which enlarges an image displayed in the display area AD such that the image can be observed.

The EVF controller 41 includes a data input portion 411 to which the image signal D (image signal DGB) is input from the image signal output portion 23, a counter 412 which counts the number (the number of times the enable signal DEnb becomes active) of the active horizontal scanning periods Hd-A in the vertical active data period DVI, a timing generating portion 413 which generates various types of timing signals defining the drive timing of the liquid crystal panel 42, a data output portion 414 which outputs the image signal D (image signal DGC) with respect to the liquid crystal panel 42, and a register 415 which stores the setting parameter PRM defining the operation of the EVF controller 41.

In the present embodiment, transmission of data between the image processing circuit 100 (image signal generating unit 20 and timing control unit 30) and the EVF controller 41 is performed through a parallel interface (not illustrated).

In a case where a user of the imaging display apparatus 1 selects an operation in the live view mode through the operation unit 60 and the imaging display apparatus 1 operates in the live view mode, before the imaging display apparatus 1 starts the operation in the live view mode, the setting parameter PRM is supplied from the parameter transmitting portion 33 to the timing generating portion 413. The timing generating portion 413 stores (sets) the transmitted setting parameter PRM in the register 415.

The setting parameter PRM set in the register 415 is a value which defines the operation of the EVF controller 41 in order to operate the EVF controller 41 in accordance with the specification of the liquid crystal panel 42.

For example, as the setting parameter PRM, the duration (or a clock number of the display dot clock signal DCLK included in the horizontal scanning period Hd. Hereinafter, the clock number of the display dot clock signal DCLK will be simply referred to as "clock number") of the horizontal scanning period Hd, the duration (or the number (N) of pixels in the X-axis direction in the display area AD) of the horizontal active data period DHI, the duration (or the clock number) of the horizontal synchronizing period DHp, the duration (or the clock number) of the horizontal back porch period DHb, the duration (or the clock number) of the horizontal front porch period DHf, the duration (or the number (M) of lines in the Y-axis direction in the display area AD. That is, the number of the active horizontal scanning periods Hd-A included in the vertical active data period DVI) of the vertical active data period DVI, the duration (or the clock number) of the vertical synchronizing period DVp, the duration (or the clock number) of the vertical back porch period DVb, and the duration (or the clock number) of the vertical front porch period DVf are favorably included.

In the imaging display apparatus 1 according to the present embodiment, since the operation timing of the EVF controller 41 can be set through the image processing circuit 100 in accordance with the specification of the liquid crystal panel 42, in a case where the liquid crystal panel 42 is changed in size, or even in a case where the specification of the liquid crystal panel 42 such as the frame rate is changed, there is no need to change the EVF controller 41. Therefore, versatility of the system can be improved.

The display dot clock signal DCLK, the output signal from the image signal output portion 23 including the image signal D (image signal DGB) and the inactive signal Dmy, and the enable signal DEnb are supplied to the data input portion 411 through the image processing circuit 100.

When the enable signal DEnb becomes active, the data input portion 411 takes in the image signal D[m] for one line which is synchronized with the display dot clock signal DCLK and is supplied from the image signal output portion 23 while the enable signal DEnb is active. The data input portion 411 outputs the taken image signal D[m] to the data output portion 414. Meanwhile, in a case where the enable signal DEnb is non-active, the data input portion 411 does not take in the inactive signal Dmy supplied from the image signal output portion 23 and the inactive signal Dmy is discarded.

The enable signal DEnb and the display vertical synchronizing signal DVsync are supplied to the counter 412 through the image processing circuit 100.

The counter 412 counts rising edges of the enable signal DEnb and outputs a count value Cnt indicating the count result to the timing generating portion 413. In addition, when the display vertical synchronizing signal DVsync becomes active and the vertical synchronizing pulse PlsV is supplied as the display vertical synchronizing signal DVsync, the counter 412 resets the count value Cnt to "zero". Therefore, the counter 412 can count the number of the active horizontal scanning periods Hd-A included in each vertical scanning period Fd. That is, in a case where the data input portion 411 takes in the image signal D[m] designating an image to be displayed in the line of the mth row, the count value Cnt indicates the line number (m) corresponding to the image signal D[m].

The display vertical synchronizing signal DVsync, the display horizontal synchronizing signal DHsync, and the setting parameter PRM are supplied to the timing generating portion 413 through the image processing circuit 100. In addition, the count value Cnt is supplied from the counter 412.

As described above, when the setting parameter PRM is supplied from the image processing circuit 100, the timing generating portion 413 sets the supplied setting parameter PRM in the register 415.

In a case where the count value Cnt indicates "m", the timing generating portion 413 causes the scanning line drive circuit 421 to select the line (scanning line) of the mth row corresponding to the count value Cnt. In addition, in a case where the count value Cnt indicates "m", the timing generating portion 413 causes the data output portion 414 to supply the image signal D[m] for one line taken in by the data input portion 411 to the data line drive circuit 422 as an image signal DGC[m]. In this case, the data line drive circuit 422 writes the image signal DGC[m] supplied from the data output portion 414 via the data line with respect to N pixels (line of the mth row) provided so as to correspond to the scanning line of the mth row selected by the scanning line drive circuit 421. Accordingly, the image of the selected line is displayed in the display area AD. In the present embodiment, the image signals DGA and DGB are digital signals. However, the image signal DGC may be a digital signal or an analog signal.

In this manner, the EVF controller 41 causes the display area AD of the liquid crystal panel 42 to display an image indicated by the image signal D supplied from the image signal output portion 23.

In a case where it is detected that the count value Cnt becomes equal to the number "M" of lines in the display area AD set in the register 415, the EVF controller 41 starts preparation for reframe processing at the timing when the display horizontal synchronizing signal DHsync is supplied first after being detected, that is, the timing when the vertical front porch period DVf starts. After the vertical front porch period DVf starts, the timing generating portion 413 outputs a reframe processing start signal Cng for commanding execution of the reframe processing to the data input portion 411 and the data output portion 414.

Here, the reframe processing is processing for preparing displaying an image in the next vertical scanning period Fd. For example, the reframe processing includes processing of executing deletion of data stored in buffers provided in the data input portion 411 and the data output portion 414. The reframe processing starts after the start of the vertical front porch period DVf. In addition, it is preferable that the reframe processing end by the time the vertical front porch period DVf ends.

<A-2: Image Processing>

Subsequently, with reference to FIGS. 9 to 11, details of the image processing portion 21 and the image processing executed by the image processing portion 21 will be described.

Figure 9:
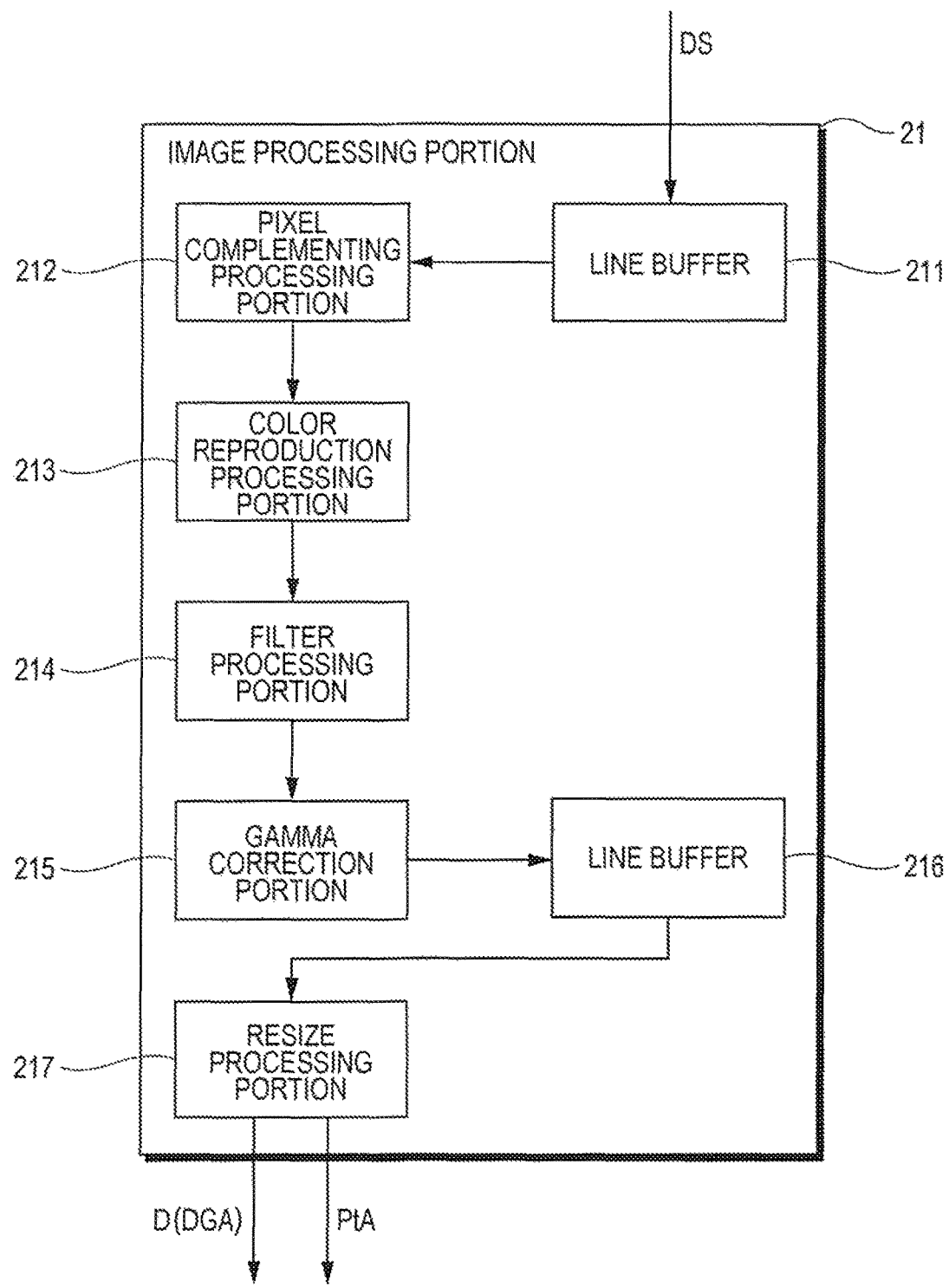
FIG. 9 is a block diagram illustrating a configuration of an image processing portion 21.

FIG. 9 is a block diagram illustrating a configuration of the image processing portion 21.

As illustrated in FIG. 9, the image processing portion 21 includes a line buffer 211 which temporarily stores the imaging signal DS output from the image sensor 12, a pixel complementing processing portion 212 which performs complementing processing with respect to the imaging signal DS stored in the line buffer 211, a color reproduction processing portion 213 which performs color reproduction processing with respect to the complemented imaging signal DS, a filter processing portion 214 which performs filter processing with respect to the imaging signal DS subjected to color reproduction, a gamma correction portion 215 which performs gamma correction with respect to the imaging signal DS subjected to the filter processing, a line buffer 216 which temporarily stores the imaging signal DS subjected to the gamma correction, and a resize processing portion 217 which performs resize processing in which the imaging signal DS stored in the line buffer 216 is converted into the image signal D for the number of pixels included in the display area AD.

Figure 10:
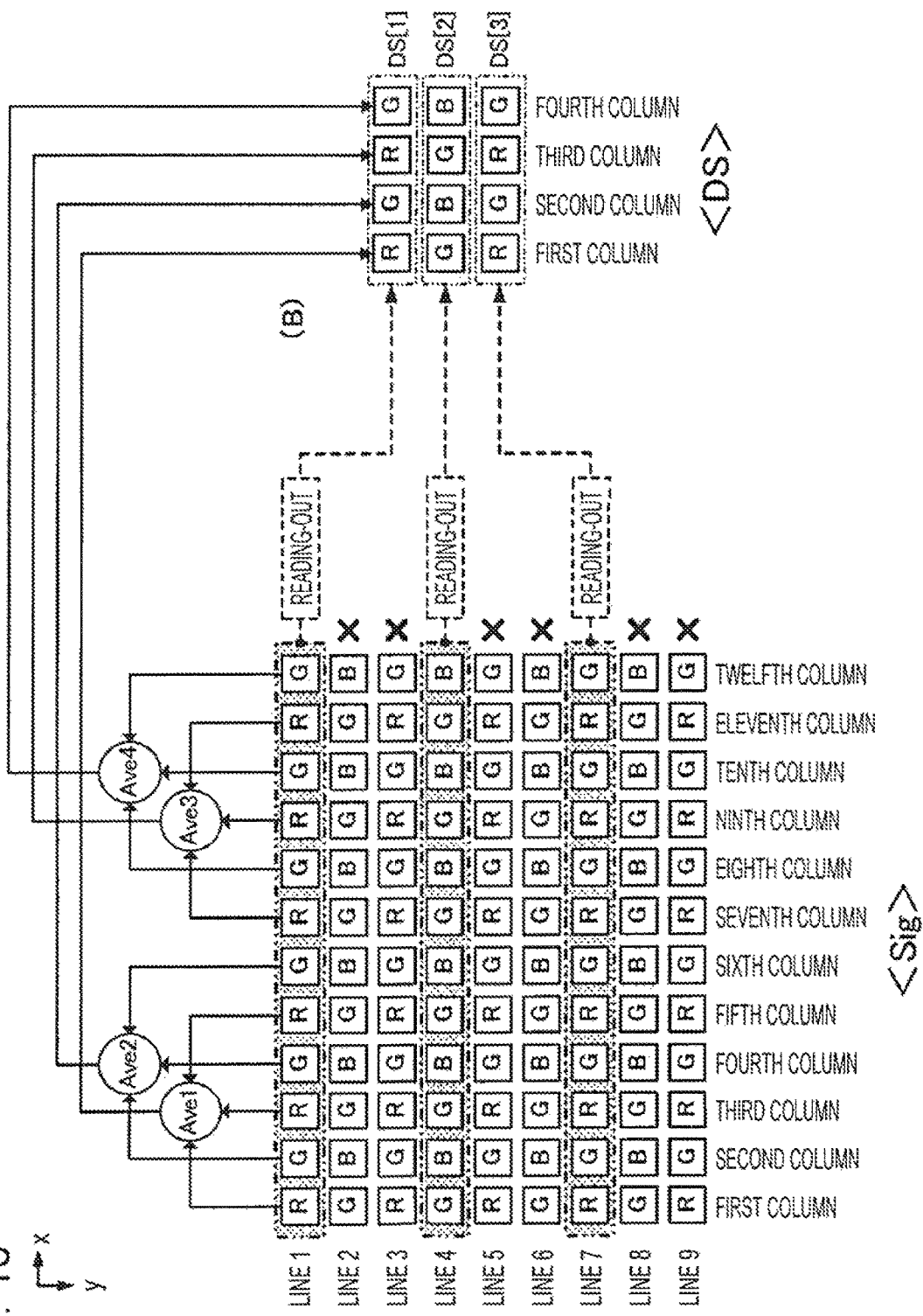
FIG. 10 is a view for describing thinning processing.

FIG. 10 is a view for describing a relationship between the pixel data signal Sig output by the light receiving elements included in the image sensor 12, and the imaging signal DS. In the present embodiment, in the active image sensor area AS of the image sensor 12, pixels of red, green, and blue are in a Bayer array. In addition, in the display area AD of the liquid crystal panel 42, pixels of red, green, and blue are in a stripe array.

As described above, in a case where the imaging display apparatus 1 operates in the imaging mode, the image sensor 12 outputs all of the pixel data signals Sig illustrated in FIG. 10 as the imaging data for a still image. Meanwhile, in a case where the imaging display apparatus 1 operates in the live view mode, the image sensor 12 performs thinning of the pixel data signal Sig and outputs the imaging signal DS illustrated in FIG. 10.

Each of the squares which are illustrated in FIG. 10 on the left side and to which "R" is applied indicates the pixel data signal Sig output from the light receiving elements corresponding to the pixels of red (for detecting red light), each of the squares to which "G" is applied indicates the pixel data signal Sig output from the light receiving elements of the pixels of green, and each of the squares to which "B" is applied indicates the pixel data signal Sig output from the light receiving elements of the pixels of blue.

In addition, each of the squares which are illustrated in FIG. 10 on the right side and to which "R" is applied indicates the imaging signal DS for generating the image signal D corresponding to the pixels of red included in the display area AD (designating the tone to be displayed in the pixels of red), each of the squares to which "G" is applied indicates the imaging signal DS for generating the image signal D corresponding to the pixels of green included in the display area AD, and each of the squares to which "B" is applied indicates the imaging signal DS for generating the image signal D corresponding to the pixels of blue included in the display area AD.

As described above, the image sensor 12 performs the thinning processing with respect to the pixel data signal Sig output by the light receiving elements of PS rows×QS columns, thereby outputting the imaging signal DS corresponding to the pixels of P rows×Q columns.

In the thinning processing, the image sensor 12 causes the pixel data signal Sig output by the light receiving elements of PS rows in the Y-axis direction to be thinned into a signal corresponding to the pixels of the P row.

Specifically, the image sensor 12 selects a reading-out target line from the PS rows and reads out the pixel data signal Sig output by the light receiving elements positioned in the reading-out target line. Meanwhile, the image sensor 12 skips reading the pixel data signal Sig output by the light receiving elements positioned in a line other than the reading-out target line, thereby performing thinning in the Y-axis direction.

In the present embodiment, since the array of the pixels provided in the active image sensor area AS of the image sensor 12 is the Bayer array, the reading-out target line is set at the ratio of one line to an odd-number line.

In a case where the pixels are in the Bayer array, the lines including red pixels and green pixels, and the lines including green pixels and blue pixels are alternately arranged in the Y-axis direction. Therefore, when the reading-out target line is set at the ratio of one line to an odd-number line, the pixels after being read out can be arrayed such that the lines including red pixels and green pixels, and the lines including green pixels and blue pixels can be alternately arranged in the Y-axis direction, and thus, the pixels of the same color can be prevented from being adjacent to each other.

In the example illustrated in FIG. 10 on the left side, in the Y-axis direction, the reading-out target line is set at the ratio of one line to three lines. Specifically, among lines 1 to 9, the line 1, the line 4, and the line 7 are set to the reading-out target lines. In this case, as illustrated in FIG. 10 on the right side, it is possible to obtain the imaging signal DS which is a result of thinning the pixel data signal Sig to one-third in the Y-axis direction.

In addition, as the thinning processing, the image sensor 12 performs arithmetic mean reading-out in the X-axis direction, thereby causing the pixel data signal Sig output by the light receiving elements of QS columns to be the signal corresponding to the pixels of Q columns (imaging signal DS).

Specifically, the image sensor 12 performs grouping of the QS light receiving elements positioned in the reading-out target line such that a predetermined number of the light receiving elements form one set. The image sensor 12 takes the arithmetic mean of the value indicated by the pixel data signal Sig output by the predetermined number of the light receiving elements configuring each set, thereby reducing the pixel data signal Sig output by the QS light receiving elements into "one of a predetermined number". In addition, the effect of the low pass filter can be obtained by taking the addition mean, and thus, aliasing noise can be restrained from being generated.

In a case where the pixels of the image sensor 12 are in the Bayer array, since the pixels of two colors are alternately arrayed in each line, grouping is performed so as to have the predetermined number of the light receiving elements as one set alternately in the X-axis direction, thereby taking the arithmetic mean of the value indicated by the pixel data signal Sig output by the predetermined number of the light receiving elements configuring each set.

In the example illustrated in FIG. 10 on the left side, in the X-axis direction, grouping is performed so as to alternately have three light receiving elements as one set, thereby averaging the value indicated by the pixel data signal Sig output by the three light receiving elements of the same color configuring each set. Specifically, for example, in the line 1 and the line 7, while having the red pixels of the first column, the third column, and the fifth column as one set, the arithmetic mean of the value of the pixel data signal Sig output by the three pixels corresponding to the three light receiving elements is taken by an adder Ave1, and the obtained mean value is set as a value of the imaging signal DS corresponding to the red pixels of the first column. Similarly, in the line 1 and the line 7, the arithmetic mean of the value of the pixel data signal Sig output by the light receiving elements corresponding to the green pixels of the second column, the fourth column, and the sixth column is taken by an adder Ave2, and the obtained mean value is set as a value of the imaging signal DS corresponding to the green pixels of the second column. In this case, as illustrated in FIG. 10 on the right side, it is possible to obtain the imaging signal DS which is a result of resizing (reducing) the pixel data signal Sig into one-third in the X-axis direction.

Figure 11:
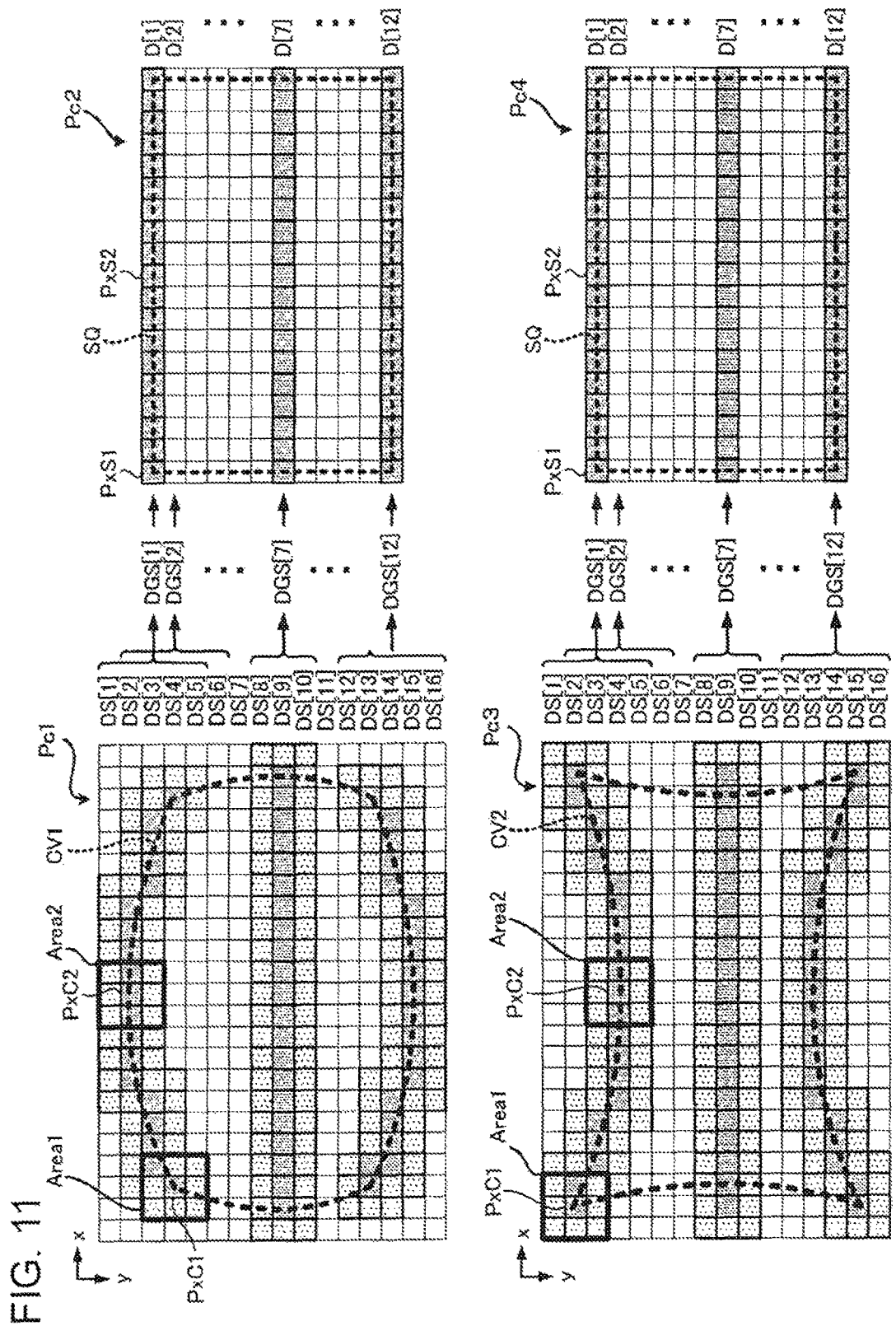
FIG. 11 is a view for describing distortion correction processing.

FIG. 11 is a view for describing the distortion aberration correction processing executed by the resize processing portion 217.

The resize processing portion 217 performs the resize processing in which an image is enlarged and reduced, other than the distortion aberration correction processing. As described above, the number of pixels of the image indicated by the imaging signal DS is different from the number of pixels of the image indicated by the image signal D (the number of pixels in the display area AD). In the resize processing portion 217, the imaging signal DS is converted into the image signal D corresponding to the number of pixels in the display area AD.

There may be a case where an image indicated by the imaging signal DS has distortion aberration caused due to optical characteristics of the lens provided in the imaging optical system 11. Specifically, an image indicating the imaging result when a subject is imaged sometimes has barrel-type aberration in which the image expands outward compared to the image to be originally displayed in the display area AD, or pincushion-type aberration in which the image contracts inward compared to the image to be originally displayed. Therefore, in the resize processing, the resize processing portion 217 executes the distortion correction processing for correcting distortion aberration such as the barrel-type aberration and the pincushion-type aberration.

Hereinafter, with reference to FIG. 11, the distortion aberration correction processing executed during the resize processing will be described. In FIG. 11, a case where there are 16 lines (P=16) of the image indicated by the imaging signal DS and there are 12 lines (M=12) of the image indicated by the image signal D is postulated.

In FIG. 11, in a case where the barrel-type aberration is generated, the image indicated by the imaging signal DS is expressed by using a sign Pc1. The image indicated by the image signal D to be displayed in the display area AD when a subject is imaged based on the imaging signal DS indicating the image Pc1 is expressed by using a sign Pc2. The image indicated by the imaging signal DS in a case where the pincushion-type aberration is generated is expressed by using a sign Pc3. The image indicated by the image signal D to be displayed in the display area AD when a subject is imaged based on the imaging signal DS indicating the image Pc3 is expressed by using a sign Pc4.

In the image Pc1, even though the image to be displayed in the display area AD is a square SQ, the imaging signal DS indicates a closed curve CV1 which is a result of the square SQ expanding due to the barrel-type aberration. In addition, in the image Pc3, even though the image to be displayed in the display area AD is the square SQ, the imaging signal DS indicates a closed curve CV2 which is a result of the square SQ contracting due to the pincushion-type aberration.

In a case where the barrel-type aberration is generated, in the distortion correction processing, the resize processing portion 217 corrects the image Pc3 indicated by the closed curve CV1 to the image Pc2 indicated by the square SQ. Similarly, in a case where the pincushion-type aberration is generated, in the distortion correction processing, the resize processing portion 217 corrects the image Pc3 indicated by the closed curve CV2 to the image Pc4 indicated by the square SQ.

In these cases, the resize processing portion 217 correlates the pixel in the image before being corrected and the pixel in the image after being corrected together. While having the pixel before being corrected corresponding to the pixel after being corrected as the center pixel, the tone of the pixels after being corrected is determined based on the tone to be displayed in each of the pixels within a reference area including the center pixel and the peripheral pixels which are pixels on the periphery thereof.

For example, in a case where the tone of a pixel PxS1 after being corrected, configuring the image Pc2 or the image Pc4 is determined, the resize processing portion 217 sets a pixel PxCL before being corrected, configuring the image Pc1 or the image Pc3, as the center pixel. The resize processing portion 217 sets the tone to be displayed in the pixel PxS1, based on the tone to be displayed in each of the pixels within a reference area Area1 including the pixel PxC1 serving as the center pixel.

Similarly, in a case where the tone of a pixel PxS2 after being corrected, configuring the image Pc2 or the image Pc4 is determined, the resize processing portion 217 sets a pixel PxC2 before being corrected, configuring the image Pc1 or the image Pc3, as the center pixel. The resize processing portion 217 sets the tone to be displayed in the pixel PxS2, based on the tone to be displayed in each of the pixels within a reference area Area2 including the pixel PxC2 serving as the center pixel.

The pixels to which dark hatching is applied in the image Pc2 and the image Pc4 indicate the pixels after being corrected positioned in the first row, the seventh row, and the twelfth row of the image signal D. The pixels to which dark hatching is applied in the image Pc1 and the image Pc3 indicate the pixels before being corrected (center pixel) respectively corresponding to the pixels after being corrected. The pixels to which light hatching is applied in the image Pc1 and the image Pc3 indicate the peripheral pixels corresponding to each center pixel.

As is evident from the example illustrated in FIG. 11, the degree of expansion of an image in a case where the barrel-type aberration is generated fluctuates depending on the position of the line in the screen, and as the position in the vertical direction (Y-axis direction) becomes close to the end portion, the degree of expansion of the image increases. In addition, the degree of contraction of an image in a case where the pincushion-type aberration is generated fluctuates depending on the position of the line in the screen, and as the position in the vertical direction (Y-axis direction) becomes close to the end portion, the degree of contraction of the image increases.

Thus, the number of lines of the imaging signal DS required in a case where the resize processing portion 217 generates the image signal D[m] fluctuates depending on the position (value of m) of the line corresponding to the image signal D[m]. Therefore, the duration required for the resize processing portion 217 to perform the resize processing fluctuates depending on the position of the line.

Here, the imaging signal DS corresponding to the line of the pth row is expressed as an imaging signal DS[p] (p is a natural number satisfying $1 \le p \le P$).

In this case, for example, in the example illustrated in FIG. 11, when the resize processing portion 217 generates the image signal D[1] corresponding to the line of the first row, the imaging signals DS[1] to DS[5] corresponding to the lines from the first row to the fifth row are required. In contrast, when the resize processing portion 217 generates the image signal D[7] corresponding to the line of the seventh row, the imaging signals DS[8] to DS[10] corresponding to the lines from the eighth row to the tenth row are required. That is, the duration required for the resize processing portion 217 to generate the image signal D[1] becomes longer than the duration required to generate the image signal D[7].

Hereinafter, the imaging signal DS[p] of one or multiple lines required to generate the image signal D[m] will be generically referred to as an imaging signal DGS[m].

For example, in the example illustrated in FIG. 11, the imaging signal DGS[1] required to generate the image signal D[1] is the imaging signal DS[p] for five lines of the imaging signals DS[1] to DS[5]. The imaging signal DGS[7] required to generate the image signal D[7] is the imaging signal DS[p] for three lines of the imaging signals DS[8] to DS[10]. The imaging signal DGS[12] required to generate the image signal D[12] is the imaging signal DS[p] for five lines of the imaging signals DS[12] to DS[16].

When the resize processing is completed and the image signal D is generated for each line, the resize processing portion 217 stores the generated image signal D[m] (image signal DGA[m]) for one line in the VRAM 22 and outputs the image processing completion signal PtA indicating that storing of the image signal D[m] in the VRAM 22 is completed.

As described above, in the present embodiment, the image signal D generated based on the imaging signal DS of one frame is stored in the VRAM 22 and the same image signal D is read out twice from the VRAM 22. Accordingly, the imaging unit 10 which operates at the frame rate of 30 fps and the display unit 40 which operates at the frame rate of 60 fps can be synchronized with each other.

In this case, as described with reference to FIG. 4, after the image processing is performed with respect to the imaging signal DS for one frame and the image signals DGA for one frame is written in the VRAM 22, the image signal DGB may be read out from the VRAM 22 so as to be supplied to the display unit 40. Otherwise, as described with reference to FIG. 5, after the image signal DGA of the Kth line is written in the VRAM 22, the image signal DGB of the first line may be read out from the VRAM 22. Particularly, in the latter case, the delay time between imaging and displaying can be shortened.

B. Second Embodiment

Figure 12:
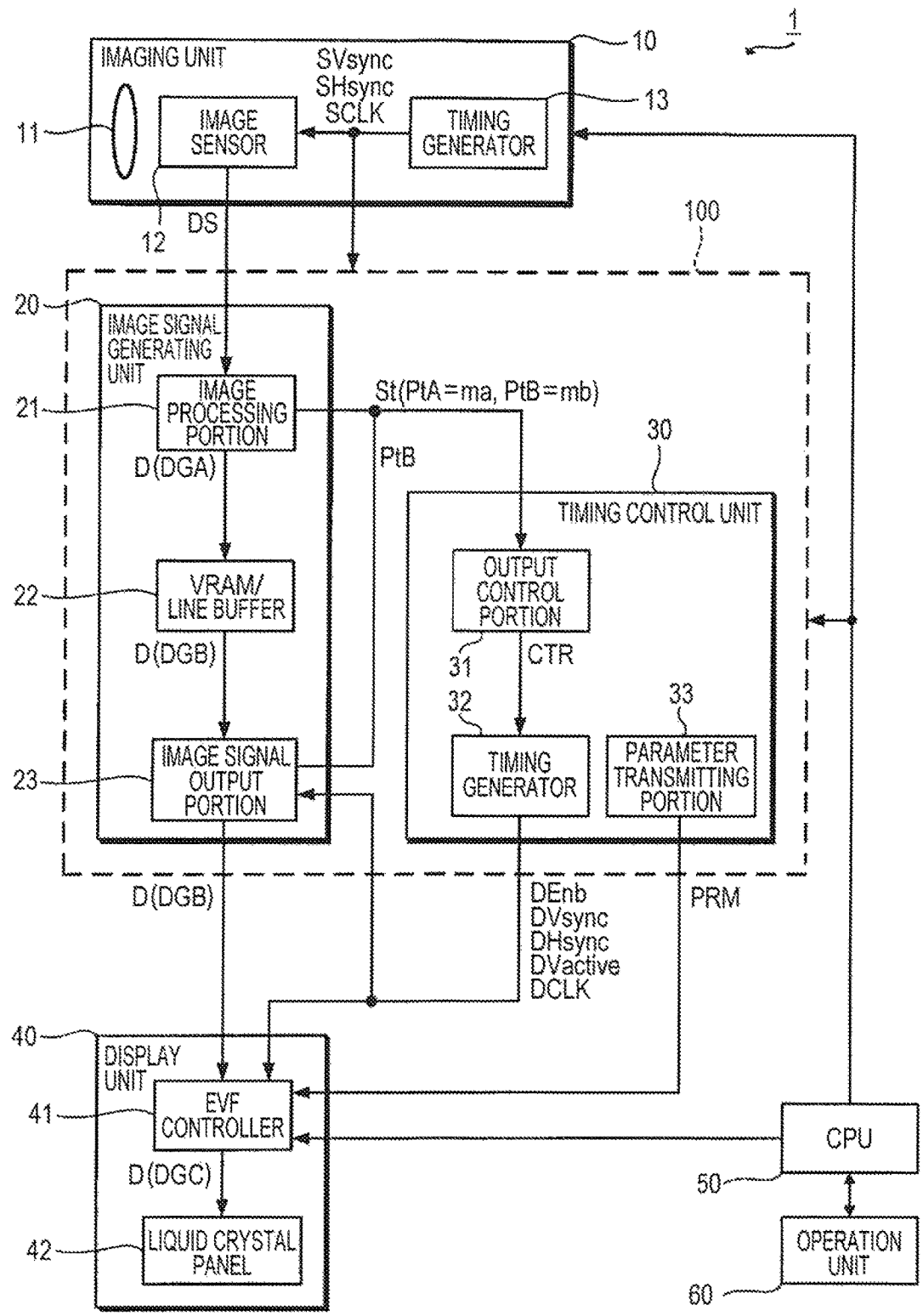
FIG. 12 is a block diagram illustrating a configuration of an imaging display apparatus 1, according to a second embodiment of the present invention.

FIG. 12 illustrates a block diagram of an imaging display apparatus 1, according to a second embodiment. The imaging display apparatus 1 according to the second embodiment is different from the imaging display apparatus 1 of the first embodiment illustrated in FIG. 1 in that the image signal output portion 23 outputs an output completion signal PtB to the timing control unit 30 and the state signal St includes the image processing completion signal PtA and the output completion signal PtB, in that the output control portion 31 generates the output control signal CTR based on the image processing completion signal PtA and the output completion signal PtB, and in that even though the display unit 40 operates at a speed which is natural number times of the frame rate of the imaging unit 10 such that the imaging unit 10 and the display unit 40 are synchronized with each other, the vertical scanning period Fd of the image signal DGB at the first display in multiple displays (for example, two or three displays) is longer than the vertical scanning period Fd of the image signal DGB in the second display and thereafter.

In the present embodiment, in a case where the image signal DGB[m] is read out from the VRAM 22 and the processing of outputting the image signal DGB[m] to the display unit 40 is completed, the image signal output portion 23 outputs the output completion signal PtB indicating that outputting the image signal DGB[m] to the display unit 40 is completed to the timing control unit 30. The output completion signal PtB is a signal indicating a line number mb corresponding to the image signal D of which outputting to the display unit 40 by the image signal output portion 23 is completed (basically, mb is a natural number satisfying 0≤mb≤M). The line number mb which is a value indicated by the output completion signal PtB is an example of "output completion line information" indicating a line of the image signal D[m] of which outputting to the display unit 40 is completed.

The value mb becomes mb=M immediately after the last line of one frame is output and maintains mb=M thereafter. At the point of time preparation for outputting an image for the next frame is completed (at the timing after the completion of the vertical back porch period after outputting a vertical synchronizing signal), the mb signal is reset, thereby becoming mb=0.

The output control portion 31 generates the output control signal CTR based on the state signal St. More specifically, in a case where the image signal DGA obtained by performing image processing with respect to the image signal DS of one frame is written in the VRAM 22 and the same image signal DGB is read out N times, at the first time in the beginning, based on the image processing completion signal PtA and the output completion signal PtB, it is determined whether or not preparation of the image signal output portion 23 for outputting the image signal D[m] (image signal DGB[m]) indicating an image to be displayed in the mth row in the display area AD to the display unit 40 is completed, and the output control signal CTR (exactingly, CTR[m]) indicating the determination result is generated. In addition, in the second time and thereafter, the output control signal CTR is generated such that the image signals DGB are continuously read out from the VRAM 22 from predetermined timing.

Here, the expression "preparation for outputting the image signal D[m] (image signal DGB[m]) is completed" denotes that the first condition and the second condition described below are fulfilled.

(First Condition) The image processing of the image signal D[m] (image signal DGA[m]) of the mth row is completed by the image processing portion 21, and writing of DGA[m] in a line buffer 22 is completed.

(Second Condition) Outputting of an image signal D[m−1](image signal DGB[m−1]) of the (m−1)th row is completed by the image signal output portion 23.

The first condition indicates a case where the line number ma indicated by the image processing completion signal PtA is equal to or greater than a line number m, that is, the first condition is fulfilled in a case where "m≤ma" is satisfied regarding m.

The second condition is fulfilled in a case where the line number mb indicated by the output completion signal PtB satisfies "mb=m−1" (strictly, in a case of "m=1", the second condition is fulfilled in a case where "mb=0" is satisfied (at the timing after the completion of the vertical back porch period after outputting a vertical synchronizing signal, the mb signal is reset, thereby becoming mb=0)).

Hereinafter, in this specification, there may be a case where the line in the display area AD displaying an image indicated by the image signal D[m] which is the target of determination performed by the output control portion 31 is referred to as "display target line". The display target line is specified by the line number of the image signal D to be output to the display unit 40 by the output control portion 31. That is, the display target line is managed by the output control portion 31 and can be specified by the line number fulfilling the first condition and the second condition. First, when the image processing is not completed already, the image signal D cannot be output to the display unit 40. Accordingly, if the display target line is the mth row, m ma indicated by the first condition is realized. Meanwhile, since the display unit 40 displays an image in the order from the first row, there is a need to fulfill that outputting the image signal D[m−1] of the (m−1)th row is completed by the image signal output portion 23, that is, there is a need to fulfill mb=m−1 of the second condition.

Strictly, when the image signal output portion 23 outputs the image signal DGB[m], there is a need to fulfill the third condition described below.

(Third Condition) The timing the image signal output portion 23 outputs the image signal D[m] (image signal DGB[m]) of the mth row is included in the period in which the display area AD can display the image (horizontal active data period DHI to be described later with reference to FIG. 4).

However, in a case where the first condition and the second condition described above are fulfilled, when the timing of outputting the image signal DGB[m] from the image signal output portion 23 is controlled by the timing generator 32, the third condition is inevitably fulfilled. Therefore, in the present embodiment, the third condition is not considered when the output control portion 31 performs determination.

Hereinafter, a method of realizing a method of controlling the output control portion 31 will be disclosed in more detail. The output control portion 31 can execute determination whether or not "preparation for outputting the image signal D[m] (image signal DGB[m]) is completed", for example, through two aspects described below.

The first aspect is an aspect in which the output control portion 31 directly executes two types of determination such as determining whether or not the first condition is fulfilled (first determination) and determining whether or not the second condition is fulfilled (second determination).

Specifically, when the image processing portion 21 outputs the image processing completion signal PtA, the output control portion 31 determines whether or not m satisfies "m≤ma" based on the line number ma indicated by the image processing completion signal PtA (executes the first determination). When the image signal output portion 23 outputs the output completion signal PtB, the output control portion 31 determines whether or not the line number mb indicated by the output completion signal PtB satisfies "mb=m−1" (executes the second determination). In a case where both the determination result of the first determination and the determination result of the second determination are positive, the output control portion 31 determines that "preparation for outputting the image signal D[m] is completed".

In this case, the output control portion 31 executes the first determination and functions as "a processing state determination portion" which determines whether or not an image signal corresponding to the image to be displayed in the display target line is generated, and the output control portion 31 executes the second determination and functions as "a display determination portion" which determines whether or not an image in the display target line can be displayed.

In a case where the determination result of the first determination or the determination result of the second determination is negative, the output control portion 31 repeats the first determination and the second determination until both the determination result of the first determination and the determination result of the second determination become positive. Specifically, for example, the output control portion 31 executes the first determination every time the image processing completion signal PtA is output from the image processing portion 21, until both the determination results of the first determination and the second determination become positive. In addition, the second determination is favorably executed every time the output completion signal PtB is output from the image signal output portion 23. In addition, for example, the output control portion 31 may repeat the first determination and the second determination in a cycle of the horizontal scanning period Hd described below until both the determination results of the first determination and the second determination become positive. When both the determination result of the first determination and the determination result of the second determination become positive, the output control signal CTR (exactingly, CTR[m]) is set to a value indicating that the determination results are positive.

Subsequently, the second aspect is an aspect in which the output control portion 31 executes determining whether or not the first condition is fulfilled (first determination) after the result of the previous determination (determining whether or not preparation for outputting the image signal D[m−1] is completed) becomes positive and at the timing the image signal output portion 23 outputs the line number mb=m−1 indicated by the output completion signal PtB.

In this aspect, in a case where the determination result of the first determination is negative, the output control portion 31 repeats the first determination until the determination result of the first determination becomes positive. When the determination result of the first determination becomes positive, the output control signal CTR is set to the value (CTR[m]) indicating that the determination result is positive.

Specifically, for example, in a case where the determination result of the first determination is negative at the timing the output completion signal PtB is output, thereafter, the output control portion 31 determines whether or not m satisfies "m≤ma" based on the line number ma indicated by the image processing completion signal PtA every time the image processing portion 21 outputs the image processing completion signal PtA. When "m≤ma" is satisfied, it is favorably determined that the first condition is fulfilled.

As described above, the image processing portion 21 generates the image signal D[m] (image signal DGA[m]) in the order of the line number, and the image signal output portion 23 outputs the image signal D[m] (image signal DGB[m]) in the order of the line number. In the present embodiment, after outputting an image signal D[m−2] in the (m−2)th row is completed and the output control portion 31 determines that "preparation for outputting the image signal D[m−1]) is completed", the image signal output portion 23 outputs the image signal D[m−1]. Thus, the timing the output control portion 31 determines whether or not "preparation for outputting the image signal D[m] (image signal DGB[m]) is completed" is the timing after the image signal D[m−2] (image signal DGB[m−2]) is output from the image signal output portion 23 and is the timing after the output control portion 31 determines that "preparation for outputting the image signal D[m−1] (image signal DGB[m−1]) is completed". That is, at the timing the output control portion 31 performs the first determination for determining whether or not "preparation for outputting the image signal D[m] is completed", the line number mb indicated by the output completion signal PtB output by the image signal output portion 23 becomes "m−1".

Therefore, in the second aspect, the output control portion 31 presumes that the second condition is fulfilled based on the output completion signal PtB output from the image signal output portion 23. The output control portion 31 executes determining (first determination) whether or not the first condition is fulfilled at the timing the output completion signal PtB is output from the image signal output portion 23, thereby determining whether or not "preparation for outputting the image signal D[m] (image signal DGB[m]) is completed".

In the present embodiment, on the premise that the second aspect is employed from two aspects described above, description will be given as follows. In the first embodiment, as described with reference to FIG. 6, in the horizontal scanning period Hd, the active horizontal scanning period Hd-A (refer to FIG. 6A) in which the image signal output portion 23 outputs the image signal D[m], and the inactive horizontal scanning period Hd-D (refer to FIG. 6B) in which the inactive signal Dmy[m] is output instead of outputting the image signal D[m] are present. However, in the first embodiment, the inactive horizontal scanning period Hd-D is not present in the vertical active data period DVI. However, in the second embodiment, by inserting the inactive horizontal scanning period Hd-D into the vertical active data period DVI, the timing of outputting the image signal D[m] is adjusted with the accuracy of the horizontal scanning period Hd in the first reading-out from the VRAM 22.

In a period other than the horizontal active data period DHI in which the enable signal DEnb becomes non-active in the active horizontal scanning period Hd-A, the image signal output portion 23 stops outputting the image signal D[m] (image signal DGB[m]) and outputs the inactive line signal DGB-dmy.

The third condition described above is fulfilled when the timing generator 32 causes the enable signal DEnb to be active in the horizontal active data period DHI. That is, the timing control unit 30 including the output control portion 31 and the timing generator 32 causes the image signal output portion 23 to output the image signal D[m](image signal DGB[m]) corresponding to the display target line at the timing all of the first condition to the third condition described above are fulfilled.

As illustrated in FIG. 6B, in a case where the horizontal scanning period Hd is the inactive horizontal scanning period Hd-D, the enable signal DEnb becomes non-active in the horizontal active data period DHI. The image signal output portion 23 outputs the inactive signal Dmy instead of the image signal D[m] (image signal DGB[m]) in the horizontal active data period DHI in the inactive horizontal scanning period Hd-D. Meanwhile, the enable signal DEnb also becomes non-active in a period other than the horizontal active data period DHI in the inactive horizontal scanning period Hd-D (horizontal synchronizing period DHp, horizontal back porch period DHb, and horizontal front porch period DHf). The image signal output portion 23 stops outputting the image signal D[m] (image signal DGB[m]) and outputs the inactive line signal DGB-dmy in a period other than the horizontal active data period DHI in the inactive horizontal scanning period Hd-D.

Based on the output control signal CTR output by the output control portion 31, the timing generator 32 determines whether the horizontal scanning period Hd is caused to the active horizontal scanning period Hd-A or the inactive horizontal scanning period Hd-D, in other words, whether or not the enable signal DEnb is caused to be active in the horizontal active data period DHI. The relationship among the output control signal CTR, the enable signal DBnb, and the type of the horizontal scanning period Hd will be described later.

Figure 13:
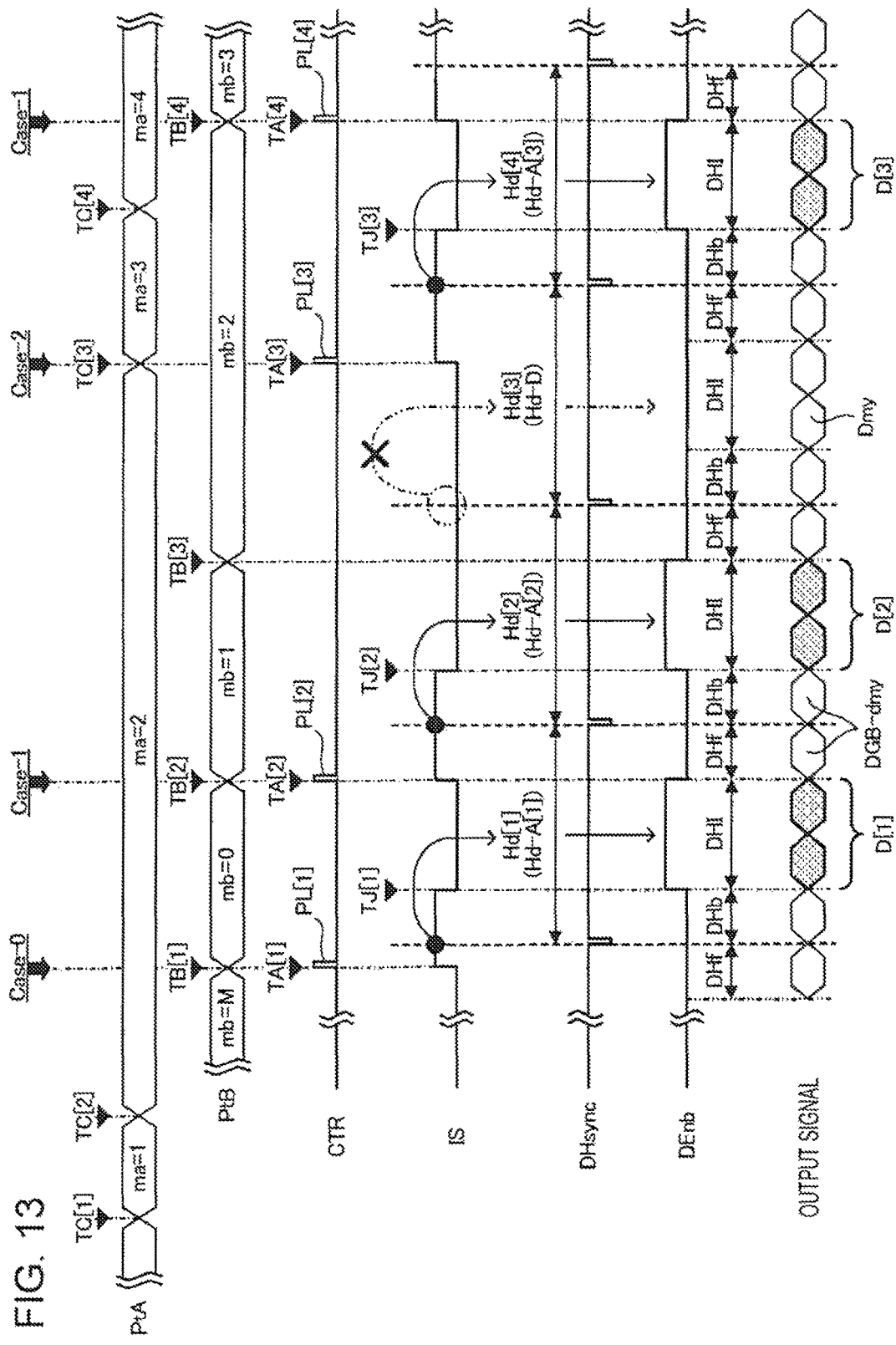
FIG. 13 is a timing chart for describing an operation of the imaging display apparatus 1.

FIG. 13 is a view for describing the output control signal CTR and the enable signal DEnb.

As described above, when it is determined that preparation for outputting the image signal D[m] is completed, that is, when the first condition and the second condition are fulfilled, the output control portion 31 sets the value CTR[m] indicating that the determination result is positive in the output control signal CTR. Here, for convenience, when it is determined that preparation for outputting the image signal D[m] is completed, the output control portion 31 outputs a pulsatile waveform temporarily rising to a high level to the output control signal CTR. As illustrated in FIG. 13, an output pulse waveform indicating the determination result to the effect that preparation for outputting the image signal D[m] set in the output control signal CTR is completed will be referred to as an output permission pulse PL[m] (=CTR [m]).

As described above, the output control portion 31 according to the present embodiment presumes that the second condition is fulfilled based on the output completion signal PtB output from the image signal output portion 23. When the output completion signal PtB is output, the output control portion 31 executes determining (first determination) whether or not the image processing of the image signal D[m] is completed (whether the first condition is fulfilled), thereby determining whether or not preparation for outputting the image signal D[m] is completed.

As illustrated in FIG. 13, in a case where the output control portion 31 determines whether or not preparation for outputting the image signal D[m] is completed, the timing the output control portion 31 determines that the image processing of the image signal D[m] is completed (determines that the first condition is fulfilled), that is, the timing a result of the first determination becomes positive will be referred to as an image processing determination time TA[m].

In addition, the timing the output completion signal PtB is supplied to the output control portion 31 (presumed that the second condition is fulfilled) will be referred to as a display preparation determination time TB[m].

In addition, hereinafter, for the convenience of description, a time generating the image signal D[m] by the image processing portion 21 is actually completed is defined as an image signal generation time TC[m]. That is, the image signal generation time TC[m] is substantially the same time as the time the image processing portion 21 outputs the image processing completion signal PtA.

The display preparation determination time TB[m] is substantially the same time as the time outputting the image signal D[m−1] from the output control portion 31 is completed and is substantially the same time as the time the horizontal active data period DHI of the active horizontal scanning period Hd-A (will be referred to as active horizontal scanning period Hd-A[m−1]) in which the image signal D[m−1] is output ends.

In this specification, the expression "substantially the same time" conceptually includes a case where the times can be presumed to be the same as each other in a case where time lags are ignored in a case where there is a time lag caused due to transmitting and receiving a signal or a time lag caused due to various types of processing.

In a case where generating the image signal D[m] (image signal DGA[m]) is completed till the display preparation determination time TB[m], that is, in a case where the image signal generation time TC[m] has elapsed till the display preparation determination time TB[m] (will be referred to as Case-1), the image processing determination time TA[m] becomes substantially the same time as the display preparation determination time TB[m].

In a case of Case-1, at the timing of the display preparation determination time TB[m] (=it is presumed that the second condition is fulfilled), the output control portion 31 performs determination to the effect that m satisfies "m≤ma" based on the line number ma indicated by the image processing completion signal PtA which is supplied to the output control portion 31 till the display preparation determination time TB[m]. Since the timing subjected to the determination is the image processing determination time TA[m], a time lag is actually present between the image processing determination time TA[m] and the display preparation determination time TB[m]. However, hereinafter, for simplification, both the times are presumed to be substantially the same as each other.

Meanwhile, in a case where generating the image signal D[m] (image signal DGA[m]) is not completed till the display preparation determination time TB[m] (that is, in a case where the image signal generation time TC[m] does not arrive till the display preparation determination time TB[m] (will be referred to as Case-2)), the image processing determination time TA[m] becomes the time generating the image signal D[m] is completed by the image processing portion 21 (that is, substantially the same time as the image signal generation time TC[m]).

In a case of Case-2, since the timing after generating the image signal D[m] is completed by the image processing portion 21 at the image signal generation time TC[m], the image processing portion 21 outputs the image processing completion signal PtA, and determination to the effect that the output control portion 31 which has received the supplied image processing completion signal PtA satisfies "m≤ma" is the image processing determination time TA[m], a time lag is present between the image processing determination time TA[m] and the image signal generation time TC[m]. However, hereinafter, for simplification, both the times are presumed to be substantially the same as each other.

In this manner, there may be cases of Case-1 and Case-2, and both the cases can be summarized as follows. The output control portion 31 sets the output permission pulse PL[m] in the output control signal CTR at the latter time between the image signal generation time TC[m] and the display preparation determination time TB[m] (that is, the time is the image processing determination time TA[m]). That is, the output permission pulse PL[m] is output when the first condition and the second condition are fulfilled regarding the image signal D[m]. After the output permission pulse PL[m] is output, that is, when the third condition is fulfilled, in other words, when the enable signal DEnb becomes active first after the output permission pulse PL[m] is output, the timing generator 32 performs controlling such that the image signal D[m] is output from the image signal output portion 23.

Hereinafter, for convenience of description, regarding the image signal D[m], the time which fulfills all of the first condition to the third condition will be referred to as an output condition fulfilling time TJ[m].

In the present embodiment, the timing generator 32 determines the level of an internal processing signal IS for using in internal processing of the timing generator 32, based on the output control signal CTR. The timing generator 32 determines the timing of causing the enable signal DEnb to be active, and the type of the horizontal scanning period Hd (active horizontal scanning period Hd-A or inactive horizontal scanning period Hd-D), based on the internal processing signal IS.

Specifically, as illustrated in FIG. 6, when the output permission pulse PL[m] is set in the output control signal CTR, the timing generator 32 causes the internal processing signal IS to be active (in the example of FIG. 6, a high level).

In a case where the internal processing signal IS is active at the timing the horizontal scanning period Hd starts, the timing generator 32 determines (sorts) the type of the horizontal scanning period Hd in an active horizontal scanning period Hd-A[m] and causes the enable signal DEnb to active at the timing the horizontal active data period DHI of the active horizontal scanning period Hd-A[m] starts. The timing the enable signal DEnb becomes active corresponds to the output condition fulfilling time TJ[m].

The timing generator 32 causes the internal processing signal IS to be non-active at the timing the horizontal active data period DHI of the active horizontal scanning period Hd-A[m] starts and the enable signal DEnb becomes active, that is, at the output condition fulfilling time TJ[m].

Meanwhile, in a case where the internal processing signal IS is non-active at the timing the horizontal scanning period Hd starts, the timing generator 32 determines (sorts) the type of the horizontal scanning period Hd in the inactive horizontal scanning period Hd-D and causes the enable signal DEnb to be non-active during the inactive horizontal scanning period Hd-D.

Here, in the example illustrated in FIG. 13, before a display preparation determination time TB[1], mb of a PtB signal maintains mb-M immediately after the last line of one frame is output. At a certain point of time after the vertical back porch period is completed after the vertical synchronizing signal is output, data of the next frame can be output. Therefore, at the point of time of the display preparation determination time TB[1], the mb signal is reset, thereby being mb=0 (Case-0). Case-0 is special timing for starting displaying of the first one line of one frame and is present only once in one frame. As a result thereof, the horizontal active data period DHI of a horizontal scanning period Hd[2] starts.

Subsequently, an example of the second line and thereafter will be described. Hereinafter, in the example illustrated in FIG. 13, description will be given regarding a case (corresponding to Case-1) where the output control portion 31 determines whether or not preparation for outputting the image signal D[2] is completed, and an output permission pulse PL[2] is set in the output control signal CTR.

In the example illustrated in FIG. 13, a display preparation determination time TB[2] is the end time of the horizontal active data period DHI of the horizontal scanning period Hd[1] (active horizontal scanning period Hd-A[1]) at which outputting the image signal D[1] is completed. In addition, in this example, a case where an image signal generation time TC[2] at which the image processing of the image signal D[2] is completed arrives before the display preparation determination time TB[2] is postulated. Thus, in this example, an image processing determination time TA[2] becomes substantially the same time as the display preparation determination time TB[2]. Therefore, the output control portion 31 outputs the output permission pulse PL[2] as the output control signal CTR at the end time of the horizontal active data period DHI of the horizontal scanning period Hd[1], that is, at the display preparation determination time TB[2].

At the timing the output permission pulse PL[2] is output as the output control signal CTR, that is, at the timing of the end of the horizontal active data period DHI of the horizontal scanning period Hd[1], the timing generator 32 causes the internal processing signal IS to active. In this case, the internal processing signal IS is active at the time of the start of the horizontal scanning period Hd[2] as well. Here, the timing generator 32 determines whether the horizontal scanning period is caused to be the active horizontal scanning period Hd-A[m] or the inactive horizontal scanning period Hd-D at the timing of starting the horizontal scanning period (DHsync pulse), based on the state of the internal processing signal IS. In the case described above, the internal processing signal IS is active. Therefore, the timing generator 32 causes the horizontal scanning period Hd[2] to an active horizontal scanning period Hd-A[2] and causes the enable signal DEnb to be active in the horizontal active data period DHI of the horizontal scanning period Hd[2].

That is, the time of starting the horizontal active data period DHI of the horizontal scanning period Hd[2] becomes an output condition fulfilling time TJ[2] in which all of the first condition to the third condition are fulfilled regarding the image signal D[2]. Therefore, in the horizontal scanning period Hd[2], the image signal D[2] is output. In addition, the timing generator 32 causes the internal processing signal IS to be non-active at the timing the horizontal active data period DHI of the horizontal scanning period Hd[2] starts.

Subsequently, in the example illustrated in FIG. 13, description will be given regarding a case (corresponding to Case-2) where the output control portion 31 determines whether or not preparation for outputting an image signal D[3] is completed and an output permission pulse PL[3] is set in the output control signal CTR.

In the example illustrated in FIG. 13, a display preparation determination time TB[3] is the end time of the horizontal active data period DHI of the horizontal scanning period Hd[2] (active horizontal scanning period Hd-A[2]) at which outputting the image signal D[2] is completed.

At the timing the horizontal synchronizing signal DHsync for displaying becomes active immediately after the display preparation determination time TB[3], "ma=2" and "mb=2" are established. That is, the image processing is in a state of not being completed. Therefore, at the timing a horizontal scanning period Hd[3] starts, the output control signal CTR becomes non-active, and the internal processing signal IS also becomes non-active.

Therefore, as indicated with "x" in the diagram, the timing generator 32 sorts the horizontal scanning period Hd[3] as the inactive horizontal scanning period Hd-D and causes the enable signal DEnb to be non-active in the horizontal active data period DHI of the horizontal scanning period Hd[3]. In this case, the image signal output portion 23 outputs the inactive signal Dmy in the horizontal active data period DHI of the horizontal scanning period Hd[3] without outputting the image signal D[3].

Thereafter, the timing generator 32 causes the internal processing signal IS to be active at the timing the output permission pulse PL[3] is output as the output control signal CTR. In this example, the timing the output permission pulse PL[3] is output is timing before a horizontal scanning period Hd[4] starts. In this case, the internal processing signal IS is active at the time of starting the horizontal scanning period Hd[4] as well. Therefore, the timing generator 32 causes the horizontal scanning period Hd[4] to be an active horizontal scanning period Hd-A[3] and causes the enable signal DEnb to be active in the horizontal active data period DHI of the horizontal scanning period Hd[4].

That is, the time of starting the horizontal active data period DHI of the horizontal scanning period Hd[4] becomes an output condition fulfilling time TJ[3] in which all of the first condition to the third condition are fulfilled regarding the image signal D[3]. Therefore, the image signal D[3] is output in the horizontal scanning period Hd[4].

In the example illustrated in FIG. 13, regarding a case where the output control portion 31 determines whether or not preparation for outputting the image signal D[1] is completed and an output permission pulse PL[1] is set in the output control signal CTR, and a case (Case-0) where the output control portion 31 determines whether or not preparation for outputting the image signal D[1] is completed and the output permission pulse PL[1] is set in the output control signal CTR, the case of having the condition of Case-1 is postulated.

In this manner, in the present embodiment, when the first condition and the second condition are fulfilled, the output control portion 31 outputs the output permission pulse PL[m] and causes the internal processing signal IS to be in an active state, thereby determining whether the internal processing signal IS is caused to be the active horizontal scanning period Hd-A[m] or an inactive horizontal scanning period Hd-Dm at the time of starting the horizontal scanning period (DHsync pulse). In a case of being determined to be the active horizontal scanning period, the image signal output portion 23 performs an operation of outputting the image signal D[m] in the first horizontal scanning period Hd after the output permission pulse PL[m] is output.

According to such an operation, regarding the timing of outputting the image signal D[m] from the image signal output portion 23 in the image processing result of a line unit D[m] performed by the image processing portion 21, the outputting is adjusted with accuracy of the unit of the horizontal scanning period Hd.

In the example illustrated in FIG. 13, the timing generator 32 determines the type of the horizontal scanning period Hd at the timing the horizontal scanning period Rd starts. However, this is merely an example. For example, the type thereof is favorably determined during a period of time from the start of the horizontal front porch period DHf of the horizontal scanning period Hd in which the output permission pulse PL[m] is output, to the end of the horizontal back porch period DHb of the first horizontal scanning period Hd after the output permission pulse PL[m] is output.

In addition, in the example illustrated in FIG. 13, the timing the internal processing signal IS becomes non-active is the timing the enable signal DEnb becomes active. However, this is merely an example. The timing the timing generator 32 causes the internal processing signal IS to become non-active may be any time as long as the timing is within the horizontal active data period DHI from when the enable signal DEnb becomes active to when the enable signal DEnb becomes non-active.

In addition, in the present embodiment, the timing generator 32 uses the internal processing signal IS so as to determine the waveform of the enable signal DEnb and the type of the horizontal scanning period Hd. However, this is merely an example. The waveform and the type may be determined based on the output control signal CTR without using the internal processing signal IS.

In addition, in the present embodiment, the output control signal CTR has a waveform including the output permission pulse PL[m]. However, this is merely an example. For example, the output control signal CTR may have the waveform of the internal processing signal IS illustrated in FIG. 13. In this case, the timing generator 32 favorably supplies various types of signals such as the enable signal DEnb required for the output control portion 31 to determine the waveform of the output control signal CTR, to the output control portion 31.

Figure 14:
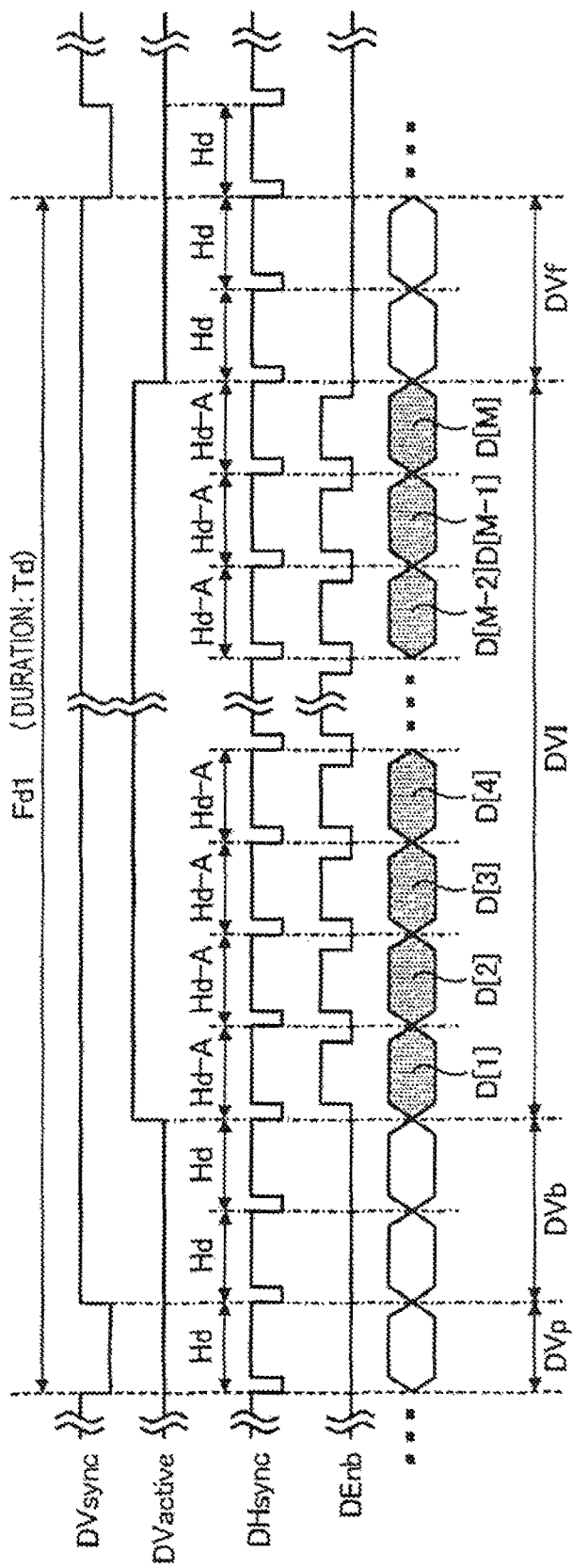
FIG. 14 is a timing chart for describing an operation of the imaging display apparatus 1.
Figure 15:
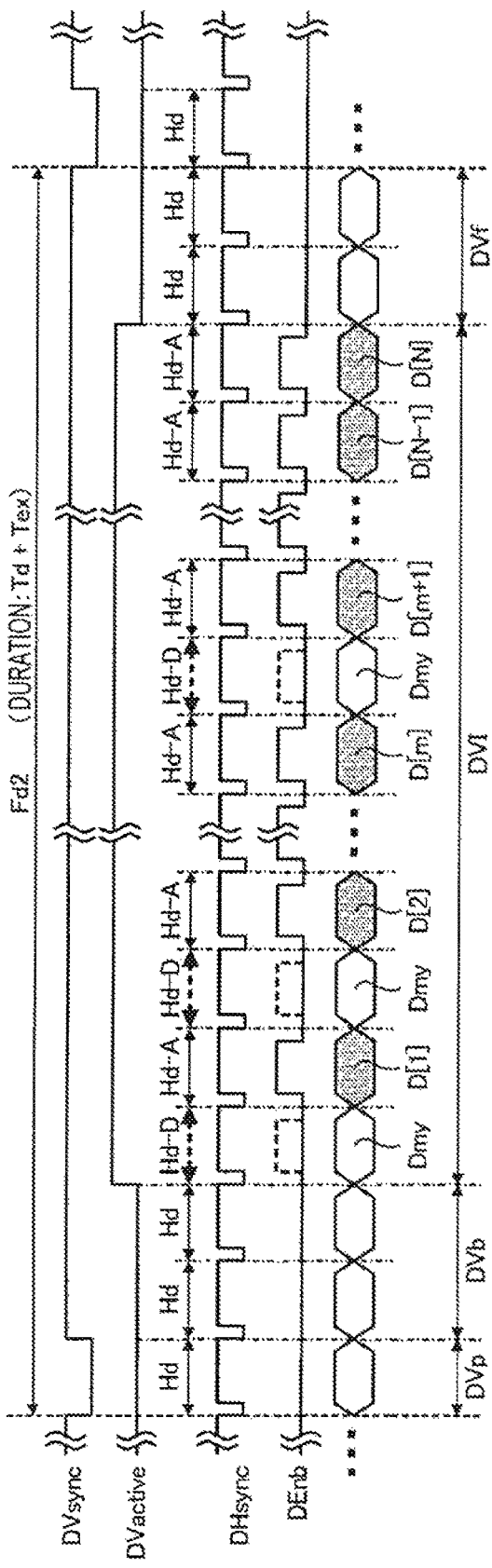
FIG. 15 is a timing chart for describing an operation of the imaging display apparatus 1.

FIGS. 14 and 15 are views for describing a relationship between the active horizontal scanning period Hd-A and the inactive horizontal scanning period Hd-D, and the vertical scanning period Fd.

The vertical scanning period Fd is a period in which the image signals D[1] to D[M] corresponding to the lines of M rows are output. Therefore, the timing generator 32 provides the vertical active data period DVI of each vertical scanning period Fd with M active horizontal scanning periods Hd-A.

Meanwhile, the timing generator 32 according to the present embodiment sorts the horizontal scanning period Hd into any one of the active horizontal scanning period Hd-A and the inactive horizontal scanning period Hd-D. Only in a case where the horizontal scanning period Hd is the active horizontal scanning period Hd-A, the image signal D[m] is output in the horizontal scanning period Hd.

Therefore, in a case where the inactive horizontal scanning period Hd-D is provided in the vertical active data period DVI of the vertical scanning period Fd, the timing generator 32 according to the present embodiment extends the vertical active data period DVI as much as the duration corresponding to the inactive horizontal scanning period Hd-D and outputs the display vertical synchronizing signal DVsync and the vertical active data signal DVactive so as to provide M active horizontal scanning periods Hd-A in the vertical active data period DVI of the vertical scanning period Fd.

For example, as in the vertical scanning period Fd1 illustrated in FIG. 14, in a case where all of the horizontal scanning periods Hd of the vertical active data period DVI are caused to be the active horizontal scanning periods Hd-A, the timing generator 32 causes the duration of the vertical active data period DVI to be a duration M times the horizontal scanning period Hd. Here, within the vertical scanning period Fd1, a period excluding the vertical synchronizing front porch period (DVf), the vertical synchronizing period (DVp), and the vertical synchronizing back porch period (DVb), that is, DVI will be called the vertical active data period DVI, thereby being a period of DVactive-H.

Meanwhile, as in the vertical scanning period Fd2 illustrated in FIG. 15, in a case where one or multiple inactive horizontal scanning periods Hd-D are provided in the vertical active data period DVI, the timing generator 32 causes the duration of the vertical active data period DVI (period of DVactive=H) to be a duration in which the duration M times the horizontal scanning period Hd and the duration of the total of one or multiple inactive horizontal scanning periods Hd-D present in the vertical active data period DVI are added.

That is, the timing generator 32 adjusts the duration of the vertical scanning period Fd by the unit of the horizontal scanning period Hd such that the image signal output portion 23 can output the image signals D[1] to D[M] in each vertical scanning period Fd.

As in the vertical scanning period Fd1 illustrated in FIG. 14, the duration of the vertical scanning period Fd in a case where all of the horizontal scanning periods Hd of the vertical active data period DVI are the active horizontal scanning periods Hd-A will be referred to as a standard vertical scanning time Td.

In addition, as in the vertical scanning period Fd2 illustrated in FIG. 15, the total value of the durations of one or multiple inactive horizontal scanning periods Hd-D in a case where one or multiple inactive horizontal scanning periods Hd-D are provided in the vertical active data period DVI will be referred to as an extension vertical scanning time Tex.

That is, the duration of the vertical scanning period Fd in a case where one or multiple inactive horizontal scanning periods Hd-D are provided in the vertical active data period DVI is the total of the standard vertical scanning time Td and the extension vertical scanning time Tex.

Figure 16:
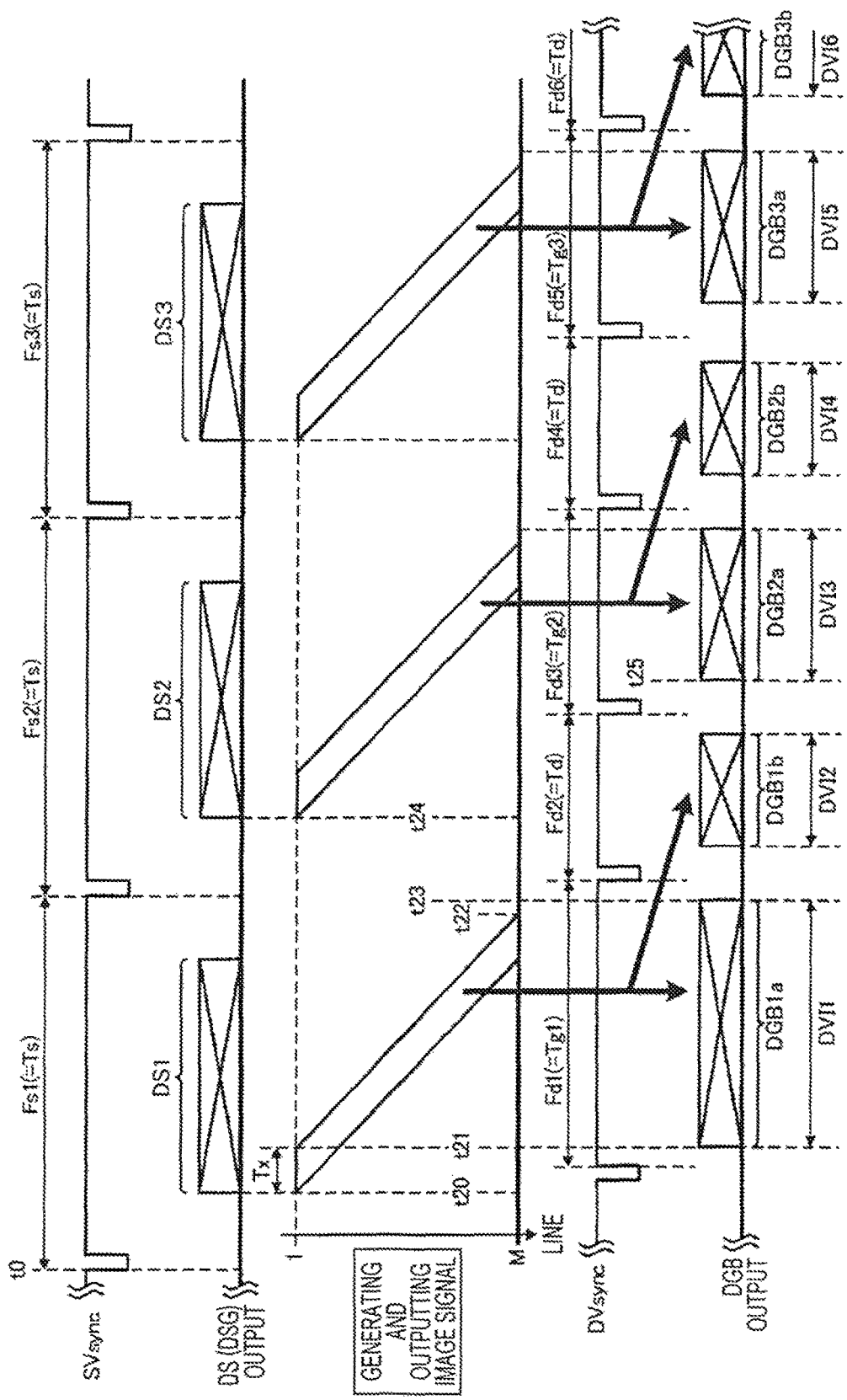
FIG. 16 is a timing chart for describing an operation of the imaging display apparatus 1.

Subsequently, a relationship between the imaging signal DS from the imaging unit 10 and the image signal DGB from the image signal generating unit 20 will be described. FIG. 16 is a timing chart illustrating a relationship between both thereof. It is presumed that the imaging signal DS is not generated before the time t0.

The imaging signals DS1, DS2, and DS3 are generated in each of the vertical scanning periods Fs1, Fs2, and Fs3.

The image processing is performed with respect to the imaging signals DS1, DS2, and DS3, and the image signals DGB1$a$, DGB1$b$, DGB2$a$, DGB2$b$, DGB3$a$, and DGB3$b$ are output. The image signal DGB1$a$ output in the vertical scanning period Fd1 is a signal obtained by reading out the image signal DGA which is a result of the imaging signal DS1 subjected to the image processing and is stored in the VRAM 22, first from the VRAM 22. An image signal DGB1$b$ output in the vertical scanning period Fd2 is a signal obtained by being read out second from the VRAM 22. Similarly, the image signal DGB2$a$ and the image signal DGB3$a$ are signals obtained by being read out first from the VRAM 22, and the image signal DGB2$b$ and the image signal DGB3$b$ are signals obtained by being read out second from the VRAM 22.

In this example, processing for generating the first line of the image signal DGB1$a$ from a time t20 starts and writing in the VRAM 22 is completed at a time t21. Then, the first line of the image signal DGB1$a$ is read out from the VRAM 22. In the example illustrated in FIG. 16, when the time from when the imaging signal DS is taken in the image signal generating unit 20 to when the image signal DGA is written in the VRAM 22 is an image processing time Tx, for simplification of illustration, a case where the image processing times Tx from the first line to the Mth line are equal to each other is exemplified.

However, actually, in order to execute processing of correcting distortion aberration described with reference to FIG. 11, the image processing time Tx varies depending on the sequence of lines. When a long image processing time Tx is required, the first condition is no longer fulfilled. Therefore, the inactive horizontal scanning period Hd-D is inserted into the vertical active data period DVI. The image signals DGB1$a$, DGB2$a$, and DGB3$a$ are generated through such image processing and are signals output first from the VRAM 22. Therefore, in the vertical active data periods DVI1, DVI3, and DVI5, the inactive horizontal scanning period Hd-D is inserted, and the durations of the vertical scanning periods Fd1, Fd3, and Fd5 are caused to extend so as to be longer than the standard vertical scanning time Td.

Meanwhile, the image signals DGB1$b$, DGB2$b$ and DGB3$b$ are generated by reading out the image signal D in which the image processing is already completed, from the VRAM 22. Therefore, the vertical active data periods DVI2, DVI4 and DVI6 are configured to with only the active horizontal scanning periods Hd-A. Thus, the durations of the vertical scanning periods Fd2, Fd4 and Fd6 become the standard vertical scanning times Td.

Here, the durations of the vertical scanning periods Fs1, Fs2, and Fs3 of the imaging unit 10 are equally Ts. In addition, the durations of the vertical scanning periods Fd1, Fd3, and Fd5 of the display unit 40 are respectively Tg1, Tg2, and Tg3, and the durations of the vertical scanning periods Fd2, Fd4, and Fd6 of the display unit 40 are the standard vertical scanning times Td. Here, Tg1≥Td, Tg2≥Td, and Tg3≥Td are established. In addition, Tg2=Tg3 is established, the following expression is established.

$$Ts=Tg2+Td=Tg3+Td$$

When the frame rate of the imaging unit 10 is 30 fps, Ts=Tg2+Td=33.333 ms is established. There are various types of combination of the frame rates of the display unit 40. In a case where one frame rate of the display unit is 61 fps, when the other frame rate is X fps, according to 1/30=1/61+1/X, X=61×30/31=59.032258 (fps) is obtained.

In this manner, the duration of the vertical scanning period Fs of the imaging signal DS matches the total of the vertical scanning periods Fd of the image signals DGB which can be obtained by reading out the same image signal from the VRAM 22.

The duration Tg1 of the vertical scanning period Fd1 is longer than Tg2 and Tg3. The reason thereof is as follows. Regarding the image signal DGB2, the image signal DGA can be stored in the VRAM 22 in advance by performing image processing during the period of time from a time t24 to a time t25. However, the imaging signal DS is output from the time t0. Therefore, regarding the image signal DGB1, the image processing cannot be precedently performed. In this manner, regarding the image signal DGB1a which is output first when the imaging unit 10 is operated, Ts which is the duration of the vertical scanning period Fs1 and Tg1+Td do not match each other.

C. Third Embodiment

In the second embodiment described above, as illustrated in FIG. 6, the inactive horizontal scanning period Hd-D is inserted into the vertical active data period DVI such that the timing of outputting the image signal D[m] is adjusted with the accuracy of the horizontal scanning period Hd and the duration of the horizontal scanning period Hd is caused to be the fixed duration.

In contrast, an imaging display apparatus according to a third embodiment is different from the imaging display apparatus 1 according to the second embodiment in that the duration of the horizontal scanning period Hd is a variable duration and the timing of outputting the image signal D[m] is adjusted based on the cycle of the display dot clock signal DCLK, for example.

That is, in an imaging display apparatus 1 of the third embodiment, in a case where the image signal DGA obtained by performing image processing with respect to the imaging signal DS is read out from the VRAM 22, regarding the image signal DGB generated through the first reading-out, the duration of the horizontal scanning period Hd is caused to extend in a case where the image processing cannot be performed in time, and regarding the image signal DGB generated through the second reading-out and thereafter, since the image signals DGA for one frame is already stored in the VRAM 22, the duration of the horizontal scanning period Hd is fixed.

Hereinafter, with reference to FIGS. 17 and 18, the imaging display apparatus according to the third embodiment will be described. In the second embodiment exemplified below, the reference sign in the description above will be applied to the element of which the operation or the function is equal to that of the second embodiment, and detailed description thereof will be suitably omitted (the same will be applied to the modification examples described below).

Figure 17:
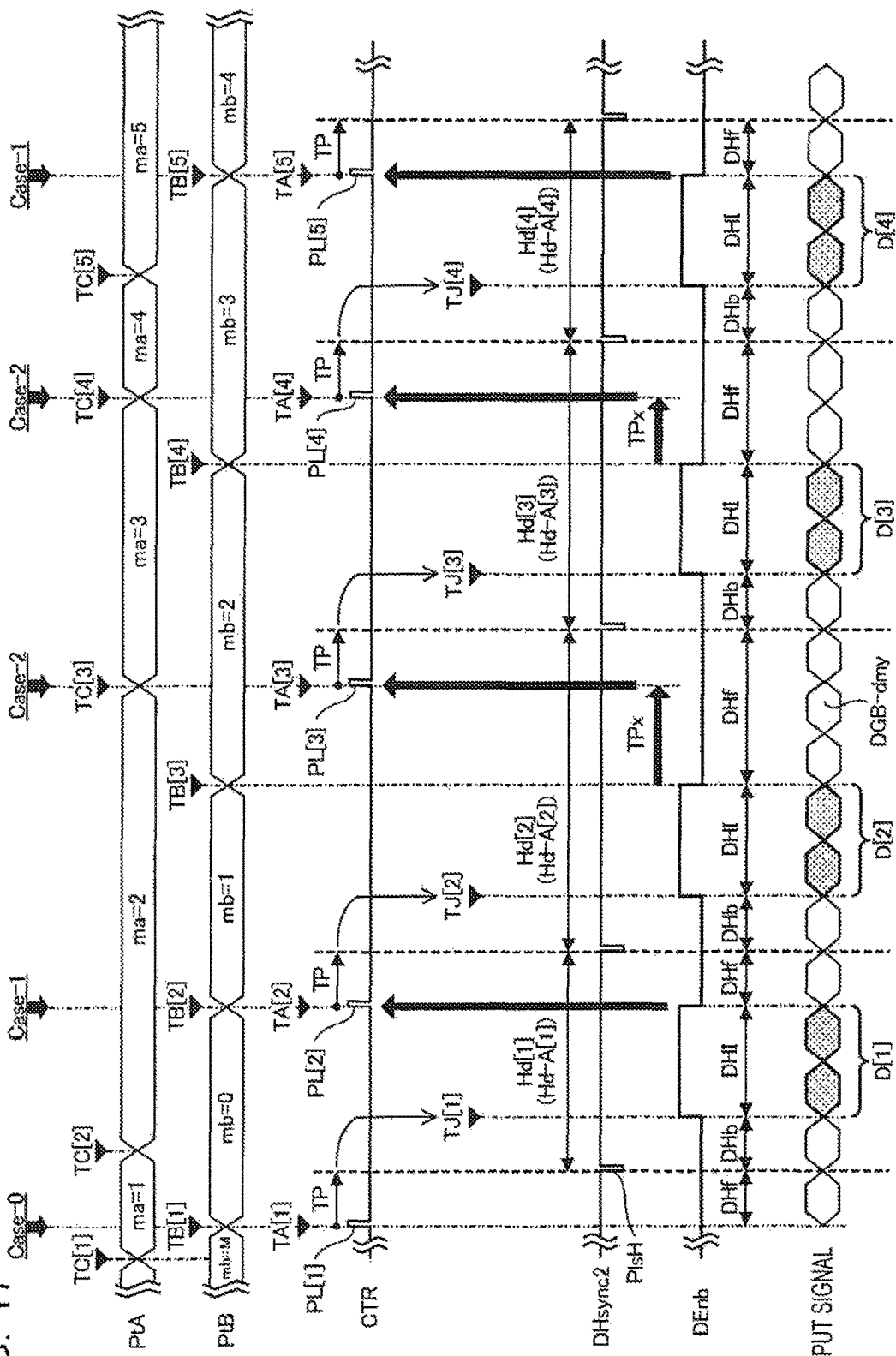
FIG. 17 is a timing chart for describing an operation of an imaging display apparatus, according to a third embodiment of the present invention.

FIG. 17 is a view for describing a relationship among the output control signal CTR, the enable signal DEnb, and a display horizontal synchronizing signal DHsync2 which are generated by the timing control unit 30 (output control portion 31 and timing generator 32) provided in the imaging display apparatus, according to the third embodiment.

The timing control unit 30 provided in the imaging display apparatus of the third embodiment is configured to be similar to that of the imaging display apparatus 1 (refer to FIG. 12) of the second embodiment except that the timing generator 32 generates the display horizontal synchronizing signal DHsync2 having the horizontal synchronizing pulse PlsH with a variable cycle instead of the display horizontal synchronizing signal DHsync and a display vertical synchronizing signal DVsync2 is generated based on the generation thereof.

As illustrated in FIG. 17, in the output control portion 31 according to the third embodiment, similar to the second embodiment, in the latter time between the image processing determination time TA[m] and the display preparation determination time TB[m] (in FIG. 17, the image processing determination time TA[m], for employing the second aspect described above), the output permission pulse PL[m] is set in the output control signal CTR.

In addition, as illustrated in FIG. 17, the timing generator 32 according to the third embodiment outputs the horizontal synchronizing pulse PlsH as the display horizontal synchronizing signal DHsync2 from the timing the output permission pulse PL[m] is set in the output control signal CTR output by the output control portion 31 after the elapse of a reference front porch time TP which is a fixed duration.

Therefore, in a case where (Case-1) generation of the image signal D[m] is completed till the display preparation determination time TB[m] and the image signal generation time TC[m] has elapsed, the duration of the horizontal front porch period DHf becomes the reference front porch time TP.

Meanwhile, in a case where generation of the image signal D[m] is not completed till the display preparation determination time TB[m], that is, in a case where (Case-2) the image signal generation time TC[m] arrives after the display preparation determination time TB[m], the duration of the horizontal front porch period DHf corresponds to the total of the reference front porch time TP and an extension front porch time TPX which is a duration from the display preparation determination time TB[m] to the image signal generation time TC[m] (image processing determination time TA [m]).

In this manner, the timing generator 32 according to the third embodiment waits until the output control portion 31 determines that preparation for outputting the image signal D[m] is completed and the output permission pulse PL[m] is output as the output control signal CTR, and starts the horizontal scanning period Hd[m] after the elapse as much as the reference front porch time TP from when the output permission pulse PL[m] is output. In other words, the timing generator 32 according to the third embodiment extends the horizontal front porch period DHf until preparation for outputting the image signal D[m] is completed.

Therefore, even in a case where the image processing of the image signal D[m] in the image processing portion 21 is delayed, the image signal output portion 23 can output the image signal D[m] in the horizontal scanning period Hd[m]. In this case, the delay time from when the imaging unit 10 outputs the imaging signal DGS[m] to when the display unit 40 displays an image based on the image signal D[m] is minimized with the accuracy of the display dot clock signal DCLK.

Figure 18:
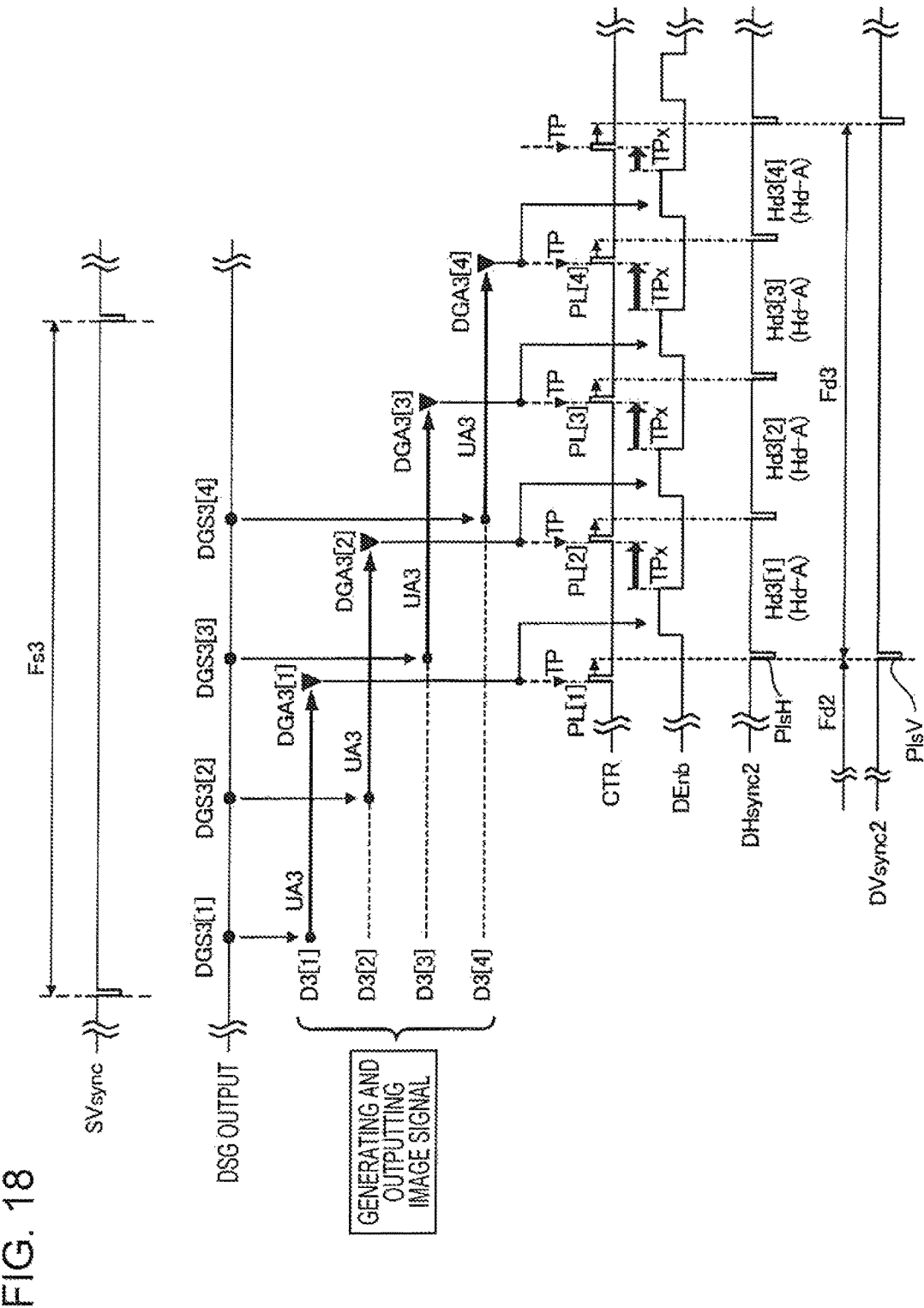
FIG. 18 is a timing chart for describing an operation of the imaging display apparatus, according to the third embodiment.

FIG. 18 is a timing chart for describing an operation of the imaging display apparatus according to the second embodiment, in a state where the image processing of the image processing portion 21 forms a bottleneck and a delay occurs in the display. In FIG. 18, for example, an image signal DGA3[3] is generated till the timing of falling of the enable signal DEnb in a horizontal scanning period Hd3[2]. Therefore, the output permission pulse PL[3] is output at the timing of falling of the enable signal DEnb in the horizontal scanning period Hd3[2]. In this case, the duration of the horizontal front porch period DHf of the horizontal scanning period Hd3[2] becomes the reference front porch time TP.

Meanwhile, in the example illustrated in FIG. 18, the timing of generating an image signal DGA3[4] is later than the timing of falling of the enable signal DEnb in a horizontal scanning period Hd3[3]. Therefore, an output permission pulse PL[4] is output at the timing the image signal DGA3[4] is generated. In this case, the duration of the horizontal front porch period DHf of a horizontal scanning period Hd2[3] becomes the duration of the total of the reference front porch time TP and the extension front porch time TPX (time from the timing of falling of the enable signal DEnb in horizontal scanning period Hd2[3] until the output permission pulse PL[4] is output). That is, at the time the delay of the display in which display preparation in the display unit 40 forms a bottleneck is canceled and thereafter, the horizontal scanning period Hd is caused to extend in accordance with the circumstances of the image processing.

In addition, in FIG. 18, the timing of generating an image signal DGA3[m] is later than the timing of falling of the enable signal DEnb in a horizontal scanning period Hd3[m−1]. Therefore, the output permission pulse PL[m] is output at the timing the image signal DGA3[m] is generated. In this case, the duration of the horizontal front porch period DHf of a horizontal scanning period Hd3[m] becomes the duration of the total of the reference front porch time TP and the extension front porch time TPX (time from the timing of falling of the enable signal DEnb in the horizontal scanning period Hd3[m] until the output permission pulse PL[m] is output). That is, in a state where the image processing of the image processing portion 21 forms a bottleneck and a delay occurs in the display, the horizontal scanning period Hd is caused to extend in accordance with the circumstances of the image processing.

As is evident from FIG. 18, in the third embodiment, the inactive horizontal scanning period Hd-D is not present, and all of the horizontal scanning periods Hd become the active horizontal scanning periods Hd-A. In addition, in the third embodiment, for example, since the horizontal scanning period Hd becomes variable by the unit of the display dot clock signal DCLK, the vertical scanning period Fd also has the variable duration.

In the imaging display apparatus 1 of the third embodiment, regarding the image signal DGB which is read out first from the VRAM 22, the horizontal scanning period Hd is caused to extend. As a result thereof, as illustrated in FIG. 16, the durations of the vertical scanning periods Fd1, Fd3, and Fd5 of the image signal DGB is elongated. Meanwhile, regarding the image signal DGB which is read out second from the VRAM 22 and thereafter, the duration of the horizontal scanning period Hd is fixed. Accordingly, in a case where the frame rate of the imaging unit 10 is lower than the frame rate of the display unit, while the delay time between imaging and displaying is shortened, the operations of the imaging unit 10 and the display unit 40 can be synchronized with each other.

D. Fourth Embodiment

In the second embodiment described above, the inactive horizontal scanning period Hd-D is inserted into the vertical active data period DVI of the image signal DGB which is read out first from the VRAM 22 such that the operations of the imaging unit 10 and the display unit 40 are synchronized with each other. In contrast, an imaging display apparatus 1 according to a fourth embodiment is different therefrom in that the inactive horizontal scanning period Hd-D is inserted into the vertical front porch period DVf of the image signal DGB which is read out last from the VRAM 22 such that the operations of the imaging unit 10 and the display unit 40 are synchronized with each other. That is, in the present embodiment, after displaying is performed N times, in a case where the image signals DGA for predetermined lines fewer than the image signals for one frame among the image signals DGB for one frame to be displayed in one succeeding frame are not generated, until the image signals DGA for predetermined lines are generated, outputting the vertical synchronizing signal DVsync for displaying is delayed.

Figure 19:
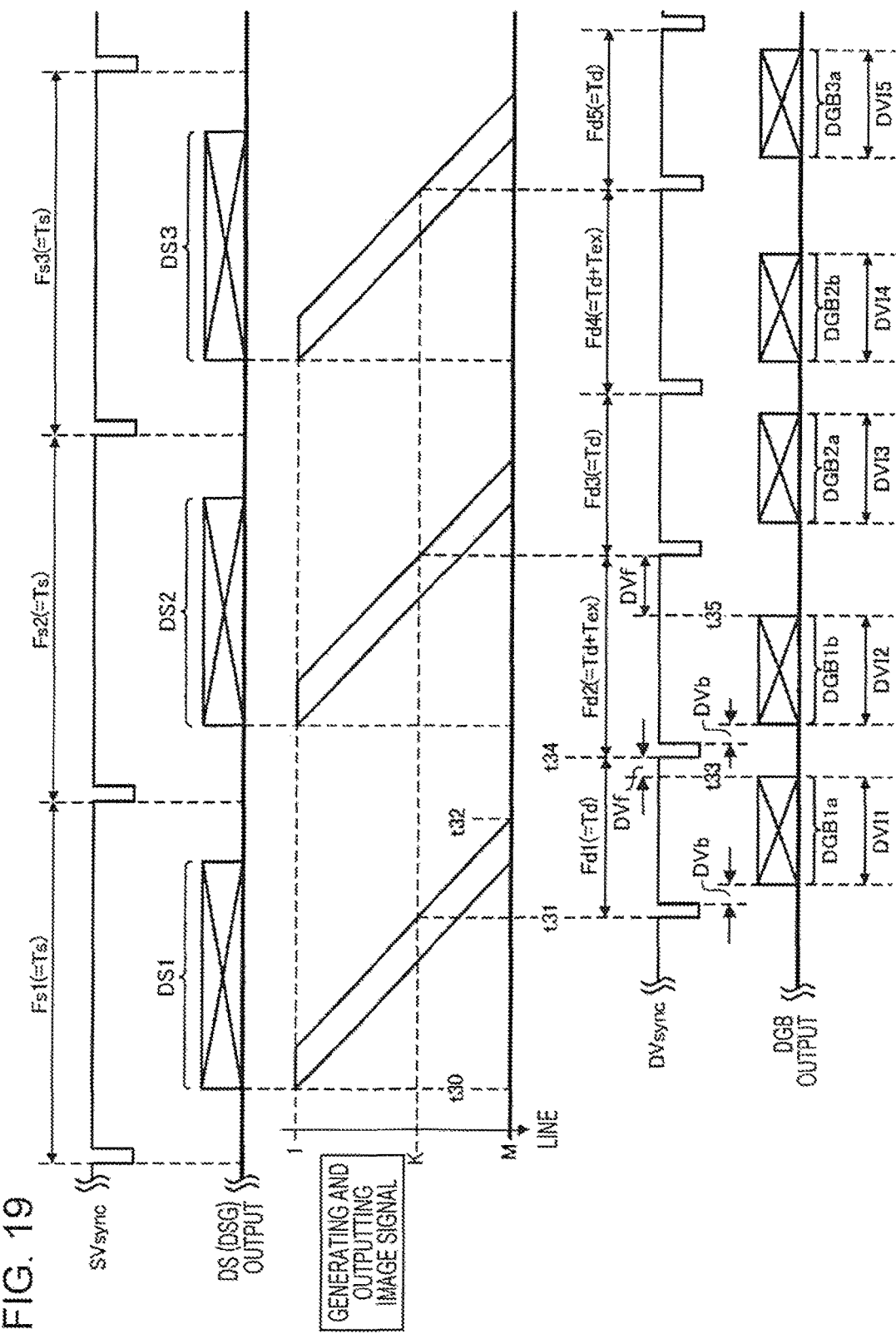
FIG. 19 is a timing chart for describing an operation of an imaging display apparatus, according to a fourth embodiment.

FIG. 19 is a timing chart illustrating a relationship between the imaging signal DS from the imaging unit 10 in the imaging display apparatus 1 of the fourth embodiment and the image signal 0 GB from the image signal generating unit 20. In this example, the frame rate of the imaging unit 10 is 30 fps and the frame rate of the display unit 40 is a frame rate higher than 60 fps.

The image processing of the imaging signal DS1 output from the imaging unit 10 in the vertical scanning period Fs1 starts from a time t30. At a time t31, the image processing of the Kth line is completed and writing of the image signal DGA[K] in the VRAM 22 is completed. At the time t31, the line number ma indicated by the image processing completion signal PtA becomes "K". When the line number ma meets "K", the timing control unit 30 causes the display vertical synchronizing signal DVsync to be active. After the elapse of the vertical back porch period DVb, the image signal DGB1a is read out from the VRAM 22. In this case, the inactive horizontal scanning period Hd-D is not provided in the vertical active data period DVI as in the second embodiment. That is, the vertical active data periods DVI (DVI1 to DVI5) of the present embodiment are configured with only the active horizontal scanning periods Hd-A. The reason is that similar to the first embodiment, "K" is set such that reading-out of the image signal DGB from the VRAM 22 does not precede writing of the image signal DGA.

In this example, the image processing of the imaging signal DS1 is completed at a time t32, and the image signals DGA for one frame are written in the VRAM 22. Therefore, in the vertical scanning period Fd2 which starts from a time t34, the image signal DGA is already prepared in the VRAM 22. Therefore, in the vertical scanning period Fd2, the image signal DGB can be read out from the VRAM 22 at a high speed. In this example, the time from the start of the vertical scanning period Fd1 to a time t33 generation of the image signal DGB1a is completed is equal to the time from the start of the vertical scanning period Fd2 to a time t35 generation of the image signal DGB1b is completed.

Subsequently, similar to the vertical scanning period Fd1, the display vertical synchronizing signal DVsync of a vertical scanning period Fd3 becomes active at the point of time the line number ma indicated by the image processing completion signal PtA meets "K". Therefore, the duration of the vertical front porch period DVf of the vertical scanning period Fd2 becomes variable. In the present embodiment, since the duration of the horizontal scanning period Hd is fixed, the duration of the vertical front porch period DVf is adjusted by setting the inactive horizontal scanning period Hd-D in the vertical front porch period DVf.

Here, when the duration of the vertical scanning period Fd1 is caused to be the standard vertical scanning time Td, the duration of the vertical scanning period Fd2 is elongated as much as the time the vertical front porch period DVf is caused to extend. The time the vertical front porch period DVf is caused to extend becomes the extension vertical scanning time Tex. Therefore, the duration of the vertical scanning period Fd2 becomes Td+Tex. The extension vertical scanning time Tex may be fixed or may be variable. The point is that the extension vertical scanning time Tex is set such that the imaging unit 10 and the display unit 40 can be synchronized with each other.

Figure 20:
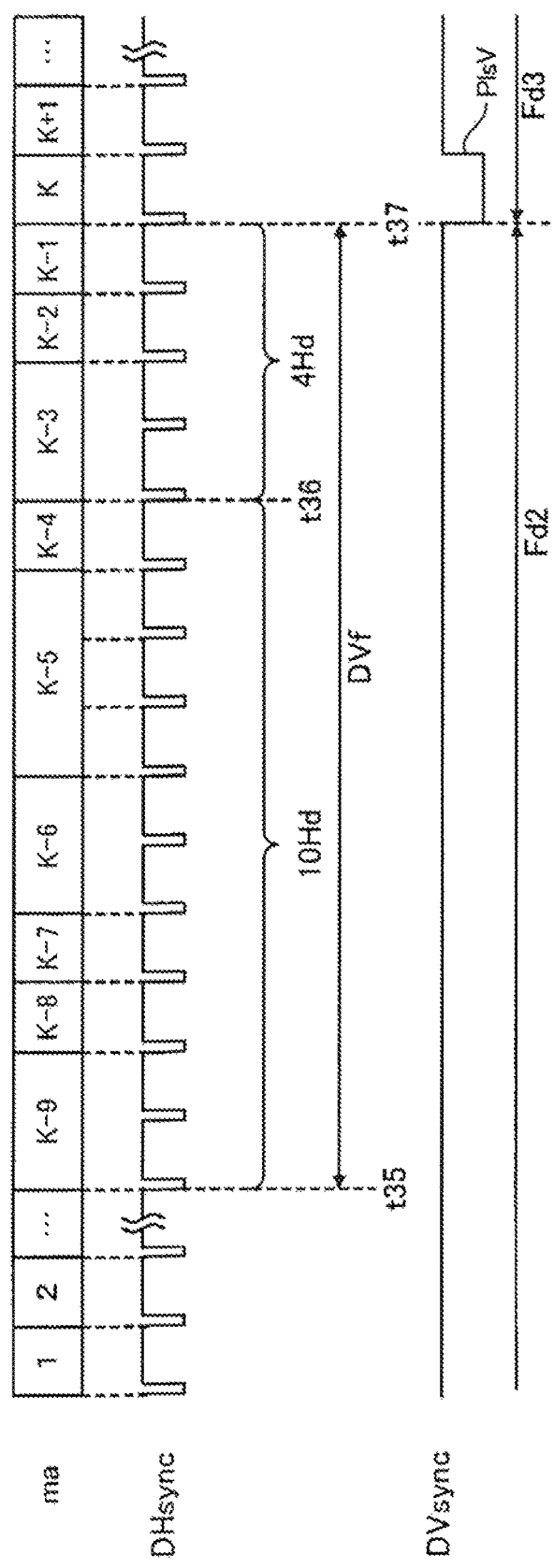
FIG. 20 is a timing chart for describing an operation of the imaging display apparatus, according to the fourth embodiment.

FIG. 20 is a timing chart illustrating the extended vertical front porch period DVf in the vertical scanning period Fd2. In this example, the vertical front porch period DVf starts from the time t35. Here, when the original duration of the vertical front porch period DVf corresponds to 10 horizontal scanning periods Hd, the vertical front porch period DVf ends at a time t36. However, in the example illustrated in FIG. 20, the line number ma indicated by the image processing completion signal PtA at a time t37 becomes "K". Therefore, the vertical synchronizing pulse PlsV is not generated at the time t36. The vertical synchronizing pulse PlsV is generated at the time t37 by extending the vertical front porch period DVf.

In this example, the duration of the vertical front porch period DVf is caused to extend as much as four horizontal scanning periods Hd. That is, while outputting the vertical synchronizing signal DVsync for displaying is delayed, a horizontal synchronizing signal DHsync for displaying a dummy is output.

In the second embodiment described above, as described with reference to FIG. 16, the time of a vertical active data period DVI1 for generating the first image signal DGB1a is elongated. In contrast, in the present embodiment, with reference to the image processing completion signal PtA indicating the progress of the image processing, when it is detected that the image processing has ended to the Kth line, the vertical synchronizing pulse Plsv is generated as the display vertical synchronizing signal DVsync, thereby starting displaying of the display unit 40. Accordingly, the duration of the vertical scanning period Fd1 corresponding to the first image signal DGB1a can meet the specification of the display unit 40.

Moreover, in the present embodiment, in a case where the same image signal DGB is read out N times from the VRAM 22, the end time of the vertical scanning period Fd reading out the Nth image signal DGB stands by until the image processing of the next frame is completed to the Kth line. Accordingly, the operations of the imaging unit 10 and the display unit 40 can be synchronized with each other.

Here, when the frame rate of the imaging signal DS is "X", the frame rate of the image signal DGB in a case where there is not time extension of the vertical front porch period DVf is "Y" (in a case where the durations of all of the vertical scanning periods Fd are the standard vertical scanning times Td), and the number of times of reading out the same image signal DGB from the VRAM 22 is N, X, and Y are the frame rates establishing the following Expression 1.

$$Y = N \times X + r \qquad \text{Expression 1}$$

However, N is a natural number equal to or greater than 2, and r is 0<r<X which is a remainder when Y is divided by X.

Moreover, it is preferable that the frame rate Y of the image signal DGB be slightly higher than N time the frame rate X of the imaging signal DS. For example, in a case where the frame rate of the imaging signal DS is 30 fps and N=2, the frame rate of the image signal DGB is favorably set to 61 fps, for example.

The reason for setting the frame rate to be slightly high is that in a case where if the frame rate Y of the display unit 40 is slightly lower than N times the frame rate X of the imaging unit 10, the display unit 40 cannot display the same image N times with respect to the vertical scanning period FS of the imaging signal DS, and thus, both thereof cannot be synchronized with each other.

In addition, when the frame cycle of an image signal Ds is Ts, the standard vertical scanning time of the image signal DGB is Td, and the extension time is Tr, Expression 2 is established.

$$Ts = Td \times N + Tr \qquad \text{Expression 2}$$

Here, when the image signal DGB is gradually increased in speed from the state where the extension time Tr is zero, the extension time Tr is elongated. This denotes that the vertical scanning period Fd of the image signal DGB read out last among the image signals DGB obtained by reading out the same image signal DGA N times from the VRAM 22 is gradually elongated. Therefore, by being set to be slightly high in speed, while the imaging unit 10 and the display unit 40 are synchronized with each other, a flicker or image unevenness can be restrained.

E. Fifth Embodiment

In the fourth embodiment described above, the inactive horizontal scanning period Hd-D is inserted into the vertical front porch period DVf of the image signal DGB read out last from the VRAM 22 such that the operations of the imaging unit 10 and the display unit 40 are synchronized with each other. In contrast, an imaging display apparatus 1 of a fifth embodiment is similar to the imaging display apparatus 1 of the fourth embodiment except that the operations of the imaging unit 10 and the display unit 40 are synchronized with each other by extending the horizontal scanning period Hd of the vertical front porch period DVf.

That is, in the present embodiment as well, as described with reference to FIG. 19, the vertical front porch period DVf of the image signal DGB read out last from the VRAM 22 is caused to extend in accordance with the progress of the image processing.

Figure 21:
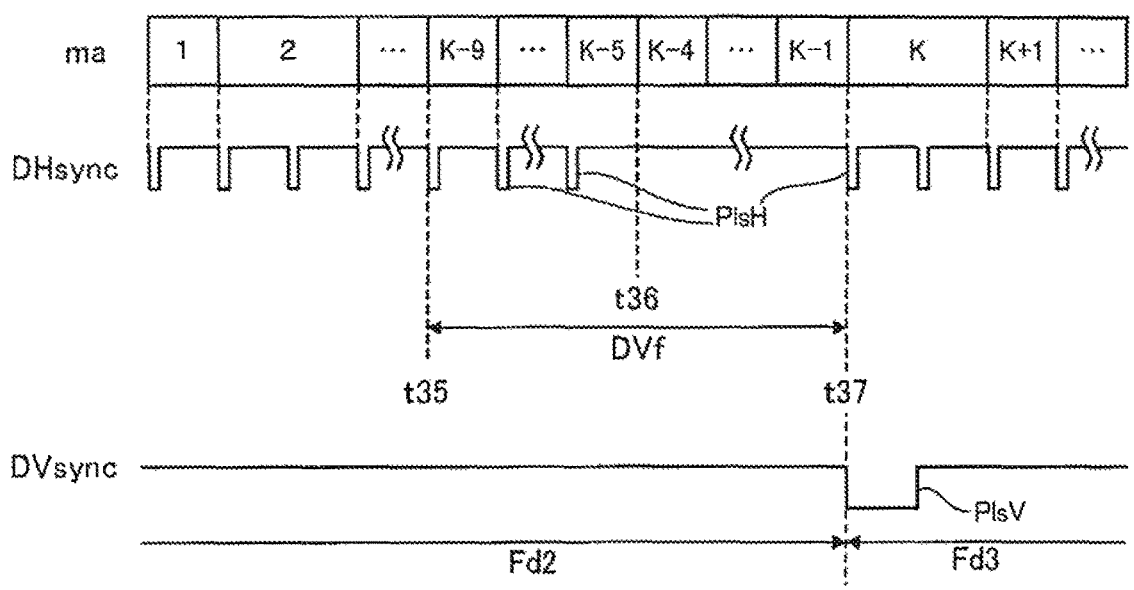
FIG. 21 is a timing chart for describing an operation of an imaging display apparatus, according to a fifth embodiment.

FIG. 21 is a timing chart illustrating the extended vertical front porch period DVf in the vertical scanning period Fd2 illustrated in FIG. 19. In this example, the vertical front porch period DVf starts from the time t35. Here, when the original duration of the vertical front porch period DVf corresponds to 10 horizontal scanning periods Hd, the vertical front porch period DVf ends at the time t36.

However, in the example illustrated in FIG. 21, the line number ma indicated by the image processing completion signal PtA at a time t37 becomes "K". Therefore, the horizontal synchronizing pulse PlsH and the vertical synchronizing pulse PlsV are not generated at the time t36. The horizontal synchronizing pulse PlsH and the vertical synchronizing pulse PlsV are generated at the time t37 by extending the horizontal scanning period Hd (extending the vertical front porch period DVf).

In the present embodiment as well, similar to the fourth embodiment, Expression 1 is established. In addition, with reference to the image processing completion signal PtA indicating the progress of the image processing when it is detected that the image processing has ended to the Kth line, the vertical synchronizing pulse PlsV is generated as the display vertical synchronizing signal DVsync, thereby starting displaying of the display unit 40. Accordingly, the operations of the imaging unit 10 and the display unit 40 can be synchronized with each other.

F. Modification Examples

Each of the embodiments hereinbefore can be variously modified. Examples of specific aspects of modification will be described below. Two or more aspects arbitrarily selected from the examples described below can be suitably combined together within a range of not being contradictory to each other. In the modification examples described below, in order to avoid overlapping of description, description of the common points with respect to the above-described embodiments of the present invention will be omitted.

Modification Example 1

In the embodiments described above, a case where the display unit 40 includes the liquid crystal panel 42 is exemplified. However, the present invention is not limited to such an aspect. A display element such as an organic light emitting diode (OLED) panel and a plasma display panel may be used.

Modification Example 2

In the embodiments and the modification example described above, transmission of data between the image processing circuit 100 and the display unit 40 is performed through the parallel interface. However, the transmission may be performed through a high-speed serial interface having a low voltage differential (LVDS).

Modification Example 3

In the embodiments and the modification examples described above, the output control portion 31 determines whether or not preparation for outputting the image signal D[m] is completed, based on the image processing completion signal PtA output by the image processing portion 21, and the output completion signal PtB output by the image signal output portion 23. However, the present invention is not limited to such an aspect. The output control portion 31 may cyclically refer to the VRAM 22 so as to determine whether or not preparation for outputting the image signal D[m] is completed, by determining whether the image signal D[m] is recorded in the VRAM 22 and the image signal D[m−1] is read out from the VRAM 22.

Modification Example 4

In the embodiments and the modification examples described above, the imaging display apparatus 1 is internally equipped with the display unit 40. However, the present invention is not limited to such an aspect. The display unit 40 may be configured as a finder (display device) or the like connected to the outside of a digital camera.

G. Application Example

The imaging display apparatus 1 exemplified in each of the embodiments hereinbefore can be utilized in various types of electronic equipment. For example, the imaging display apparatus 1 may be configured as electronic equipment (display device) such as a projector apparatus, a head-up display (HUD), and a head mounted display (HMD). In addition, in a case of a display device conducting a live view, for example, the imaging display apparatus 1 can also be applied to electronic binoculars, electronic spectacles, an electron microscope, a finder of medical-purpose electronic spectacles, an in-car back monitor, and a monitor for an in-car side mirror. Thus, a delay between imaging and displaying can be reduced. In addition, as an aspect of the display device, the imaging unit 10 is not necessarily included. That is, the image processing circuit 100 and the display unit 40 to which the imaging signal DS is supplied may be taken as the display device.

The entire disclosure of Japanese Patent Application No. 2014-163440, filed Aug. 11, 2014 and Japanese Patent Application No. 2015-135478, filed Jul. 6, 2015 are expressly incorporated by reference herein.

REFERENCE SIGNS LIST

1 IMAGING DISPLAY APPARATUS
10 IMAGING UNIT
11 IMAGING OPTICAL SYSTEM
12 IMAGE SENSOR
13 TIMING GENERATOR
20 IMAGE SIGNAL GENERATING UNIT
21 IMAGE PROCESSING PORTION
22 LINE BUFFER
23 IMAGE SIGNAL OUTPUT PORTION
30 TIMING CONTROL UNIT
31 OUTPUT CONTROL PORTION
32 TIMING GENERATOR
33 PARAMETER TRANSMITTING PORTION
40 DISPLAY UNIT
41 EVF CONTROLLER
42 LIQUID CRYSTAL PANEL
50 CONTROL UNIT
60 OPERATION UNIT
100 IMAGE PROCESSING CIRCUIT

The invention claimed is:
1. An imaging display apparatus comprising:
an image sensor that images a subject at a first frame rate and outputs an imaging signal;
an image processing circuit that generates an image signal based on the imaging signal;
a display unit that performs displaying based on the image signal at a second frame rate which is equal to or greater than N (N is a natural number equal to or greater than 2) times the first frame rate; and
a timing control circuit that outputs a horizontal synchronizing signal and a vertical synchronizing signal to the display unit,
wherein the display unit starts to perform displaying N times based on the image signal after the image processing circuit generates image signals for predetermined lines that are equivalent to (N−1)/N, and
after displaying is performed N times, in a case where the image signals for predetermined lines that are equivalent to (N−1)/N for one frame to be displayed in one succeeding frame are not generated, outputting the vertical synchronizing signal is delayed until the image signals for predetermined lines are generated.

2. The imaging display apparatus according to claim 1, wherein the timing control circuit outputs a dummy horizontal synchronizing signal while outputting the vertical synchronizing signal is delayed.

3. An imaging display apparatus comprising:

an image sensor that images a subject at a first frame rate and outputs an imaging signal;

an image processing circuit that generates an image signal based on the imaging signal; and a display unit that performs displaying based on the image signal at a second frame rate which is greater than N (N is a natural number equal to or greater than 2) times the first frame rate by one fps, wherein the display unit starts to perform displaying the N times based on the image signal before the image sensor completes outputting the imaging signal based on which the image signal is generated.

4. An imaging display comprising:

an image sensor that images a subject at a first frame rate and outputs an imaging signal;

an image processing circuit that generates an image signal based on the imaging signal; and a display unit that performs displaying based on the image signal at a second frame rate which is equal to or greater than N (N is a natural number equal to or greater than 2) times the first frame rate, wherein the display unit starts to perform displaying N times based on the image signal after the image processing circuit generates image signals for predetermined lines that are equivalent to (N−1)/N, and the display unit starts to perform displaying the N times based on the image signal before the image sensor completes outputting the imaging signal based on which the image signal is generated.

5. A method of controlling an imaging display apparatus including an image sensor which images a subject at a first frame rate and outputs an imaging signal, an image processing circuit which generates an image signal based on the imaging signal, and a display unit which performs displaying based on the image signal at a second frame rate which is greater than N (N is a natural number equal to or greater than 2) times the first frame rate by one fps, wherein the display unit starts to perform displaying the N times based on the image signal before the image sensor completes outputting the imaging signal based on which the image signal is generated.

* * * * *